(12) United States Patent
Menkhoff et al.

(10) Patent No.: US 8,923,434 B2
(45) Date of Patent: Dec. 30, 2014

(54) METHOD AND APPARATUS FOR MODIFYING A COMPLEX-VALUED SIGNAL, AND MOBILE COMMUNICATION DEVICE

(71) Applicants: Andreas Menkhoff, Oberhaching (DE); Staffan Sahlin, Munich (DE)

(72) Inventors: Andreas Menkhoff, Oberhaching (DE); Staffan Sahlin, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 21 days.

(21) Appl. No.: 13/763,760

(22) Filed: Feb. 11, 2013

(65) Prior Publication Data
US 2014/0226756 A1    Aug. 14, 2014

(51) Int. Cl.
| | |
|---|---|
| H04K 1/02 | (2006.01) |
| H04L 25/03 | (2006.01) |
| H04L 25/49 | (2006.01) |
| H04L 27/20 | (2006.01) |

(52) U.S. Cl.
CPC ................................ *H04L 27/20* (2013.01)
USPC ........... 375/296; 375/298; 375/261; 375/284; 375/285; 375/235; 455/102; 455/114.2; 455/114.3

(58) Field of Classification Search
USPC ................. 375/296, 298, 261, 284, 285, 235; 455/102, 114.2, 114.3
See application file for complete search history.

(56) References Cited

U.S. PATENT DOCUMENTS 8,131,229 B1 *   3/2012   Wilson et al. ................. 455/102

* cited by examiner

*Primary Examiner* — Phuong Phu
(74) *Attorney, Agent, or Firm* — Eschweiler & Associates, LLC

(57) ABSTRACT

A method and an apparatus for modifying a complex-valued signal are described, the complex-valued signal representing a first symbol and a second symbol. A signal trajectory of the complex-valued signal between the first and second symbols is determined, and, if the signal trajectory passes nearby the constellation origin, the signal trajectory is altered to run closer to the constellation origin.

20 Claims, 24 Drawing Sheets

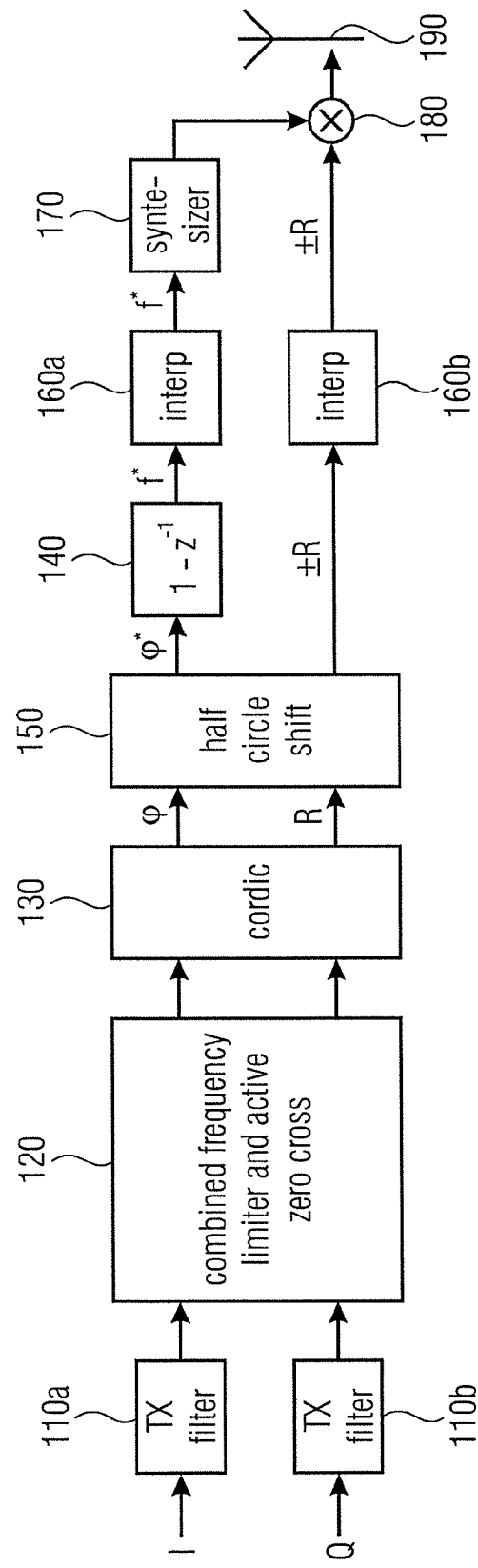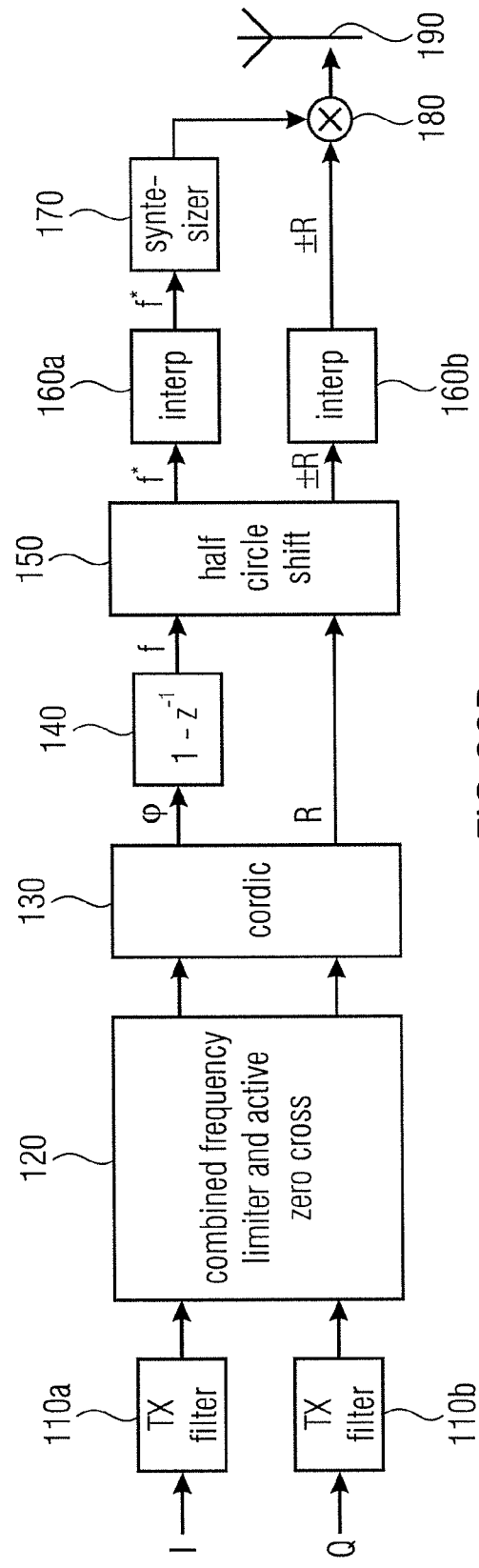
FIG 20A
FIG 20B

METHOD AND APPARATUS FOR MODIFYING A COMPLEX-VALUED SIGNAL, AND MOBILE COMMUNICATION DEVICE

BACKGROUND

Digital information may be transmitted via an air interface by modulating a high frequency carrier signal. The digital information may be created and processed at a symbol rate determined by the time which is reserved to transmit a single symbol over the air interface. When different symbols are transmitted, a smooth transition between subsequent symbols is created to avoid influencing neighboring channels and to maintain a desired quality of the transmitted signal. When the transmitted digital information is represented by symbols within the complex plane, trajectories in the complex plane are created between the consecutive symbols. The trajectories can thus be understood to be a representation of a complex valued signal generated by the transition between two subsequent symbols. The phase and the magnitude along the trajectories are modulated on the high frequency carrier to provide a smoothly varying modulated high frequency carrier. The modulation may be performed based on the magnitude or radius parameter R and the phase parameter φ or may be based on the real part (in phase component I) and the imaginary part (quadrature component Q) of the representation of the complex-valued signal defined by the trajectory in the imaginary plane.

SUMMARY

A method for modifying a complex-valued signal representing a first symbol and a second symbol, includes determining a signal trajectory of the complex-valued signal between the first and second symbols, and, if the signal trajectory passes nearby the constellation origin, altering the signal trajectory to run closer to the constellation origin.

BRIEF DESCRIPTION OF THE DRAWINGS

FIGS. 6A-6B show a simulated spectrum of an LTE10 signal in a polar transmitter architecture, wherein FIG. 6A shows the spectrum before interpolating the R/phi signal, and FIG. 6B shows the spectrum after interpolation of the R/phi signal;

FIGS. 15A-15B show a comparison of forced zero crossing when compared to known frequency limited signals, wherein FIG. 15A represents known frequency limited signals, and FIG. 15B shows signals forced through the constellation origin;

FIGS. 20A-20F show different placements of the zero forcing algorithm within a polar transmitter chain as shown in FIG. 14.

DETAILED DESCRIPTION

Figure 1:
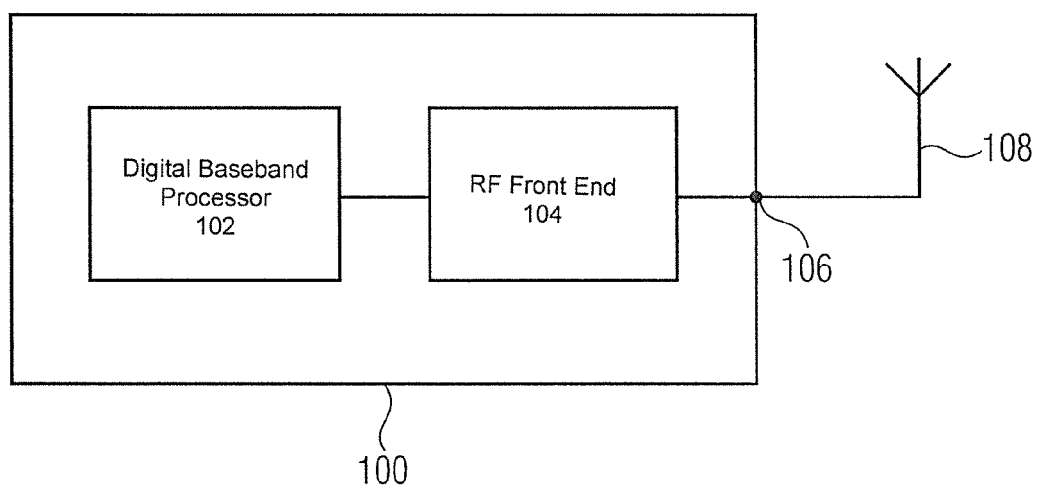
FIG. 1 shows a block diagram of an example mobile communication device.

FIG. 1 shows a block diagram of an example mobile communication device 100 comprising a digital baseband processor 102, an RF front end 104 coupled to the baseband processor 102 and to an antenna port 106. The antenna port 106 is provided to allow connection of an antenna 108 to the mobile communication device 100. The baseband processor 102 generates signals to be transmitted via the antenna 108 which are forwarded to the RF front end 104 generating a transmit signal output to the antenna port 106 for transmission via the antenna 108. The RF front end 104 may also receive signals via the antenna port 106 from the antenna 108 and provides respective signals to the baseband processor 102 for processing the received signals. The apparatus and the method described in further detail in the following may be implemented in the baseband processor 102, for example, in a processor operating on data signals for generating the respective input signals to the RF front end 104, and/or in the RF front end 104, like in a polar transmitter used for generating the transmit signal output at antenna port 106 based on inputs signals received from the baseband processor.

The mobile communication device 100 may be a portable mobile communication device and may be configured to perform a voice and/or data communication according to a mobile communication standard with other communication devices, like other mobile communication devices or base stations of a mobile communication network. Mobile communication devices may comprise a mobile handset, such as a mobile phone or a smart phone, a tablet PC, a broadband modem, a laptop, a notebook, a router, a switch, a repeater or a PC. Also, the mobile communication device 100 may be a base station of a communication network.

Figure 2:
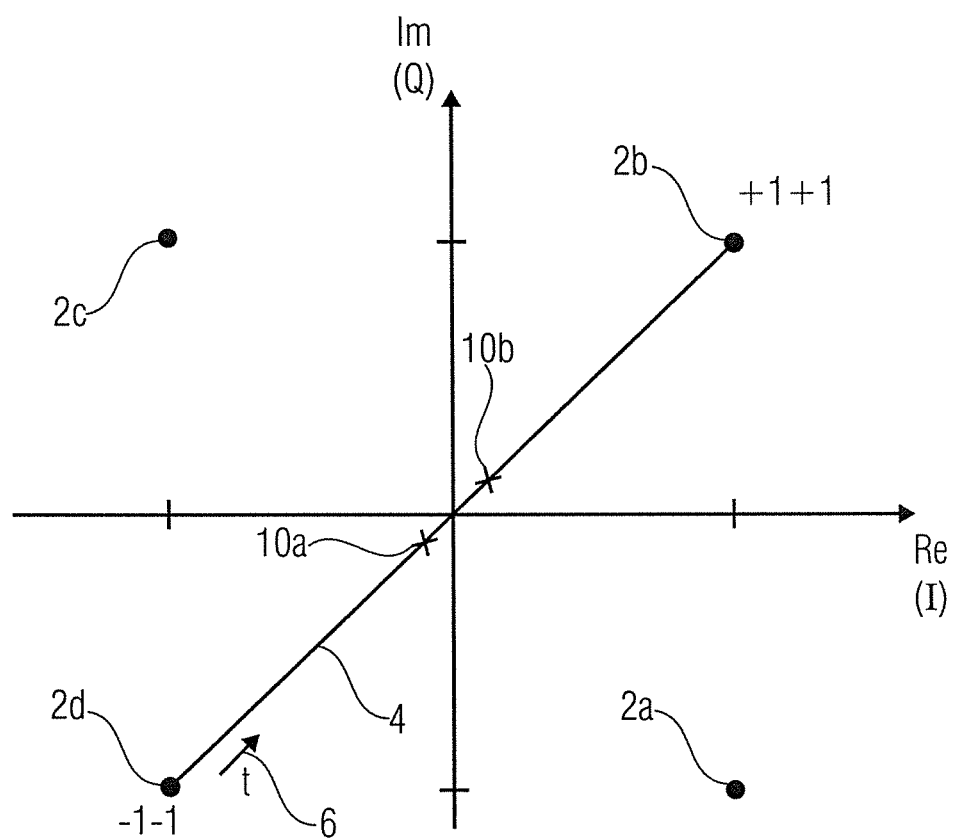
FIG. 2 shows an example representation of a complex-valued signal.

FIG. 2 shows an example representation of a complex-valued signal. The real part (in-phase component) is shown on the X-axis and the imaginary part (quadrature component Q) is shown on the Y-axis. FIG. 2 shows a constitution diagram of a 4PSK modulation. One bit may be transmitted by the in-phase component I and one bit by the quadrature component. Thus, four individual symbols $2a$ to $2d$ can be defined, wherein one symbol is transmitted at a time, that is within a predetermined time window reserved for the transmission of the information corresponding to one symbol. A high frequency carrier may be modulated differently for each symbol and digital data is transmitted by subsequently transmitting multiple symbols over the modulated carrier. There is no instantaneous switchover between the modulation states corresponding to the individual symbols when transiting between neighboring symbols (at a frequency defined by the symbol rate). The instantaneous switchover is avoided to not introduce high frequencies into the spectrum, which may disturb neighboring transmission channels. To avoid such a disturbance, a smooth transition is performed between neighboring symbols. This may be achieved by pulse shaping the logical signals corresponding to each symbol.

This fade-over of the high frequency signal is illustrated in the constellation diagram of FIG. 2 by a trajectory connecting symbol $2d$ to symbol $2b$. When first transmitting symbol $2d$ and subsequently transmitting symbol $2b$, the trajectory 4 evolves with time from symbol $2d$ to symbol $2b$ as indicated by the time direction 6. In more general terms, the trajectory 4 is a representation of the complex-valued signal, which is created by the transition between subsequently sent symbols in the constellation diagram. The representation of the complex-valued signal 4 defined by the transition of the symbol $2d$ to the symbol $2b$ is modulated on the high frequency carrier when first sending the information corresponding to symbol $2d$ and then sending the information corresponding to symbol $2b$. The modulation may be performed by an I/Q modulator receiving as an input a signal corresponding to the real part (I) of the trajectory 4 and a further signal corresponding to the imaginary part (Q) of the trajectory 4. Alternatively, the magnitude R along the trajectory and the phase angle $\phi$ along the trajectory may be input into an R/$\phi$ modulator to synthesize the modulated high frequency signal. Separate time dependent functions (signals) for I and Q or for R and $\phi$ are just different representations of the complex-valued signal of FIG. 2.

Figure 3:
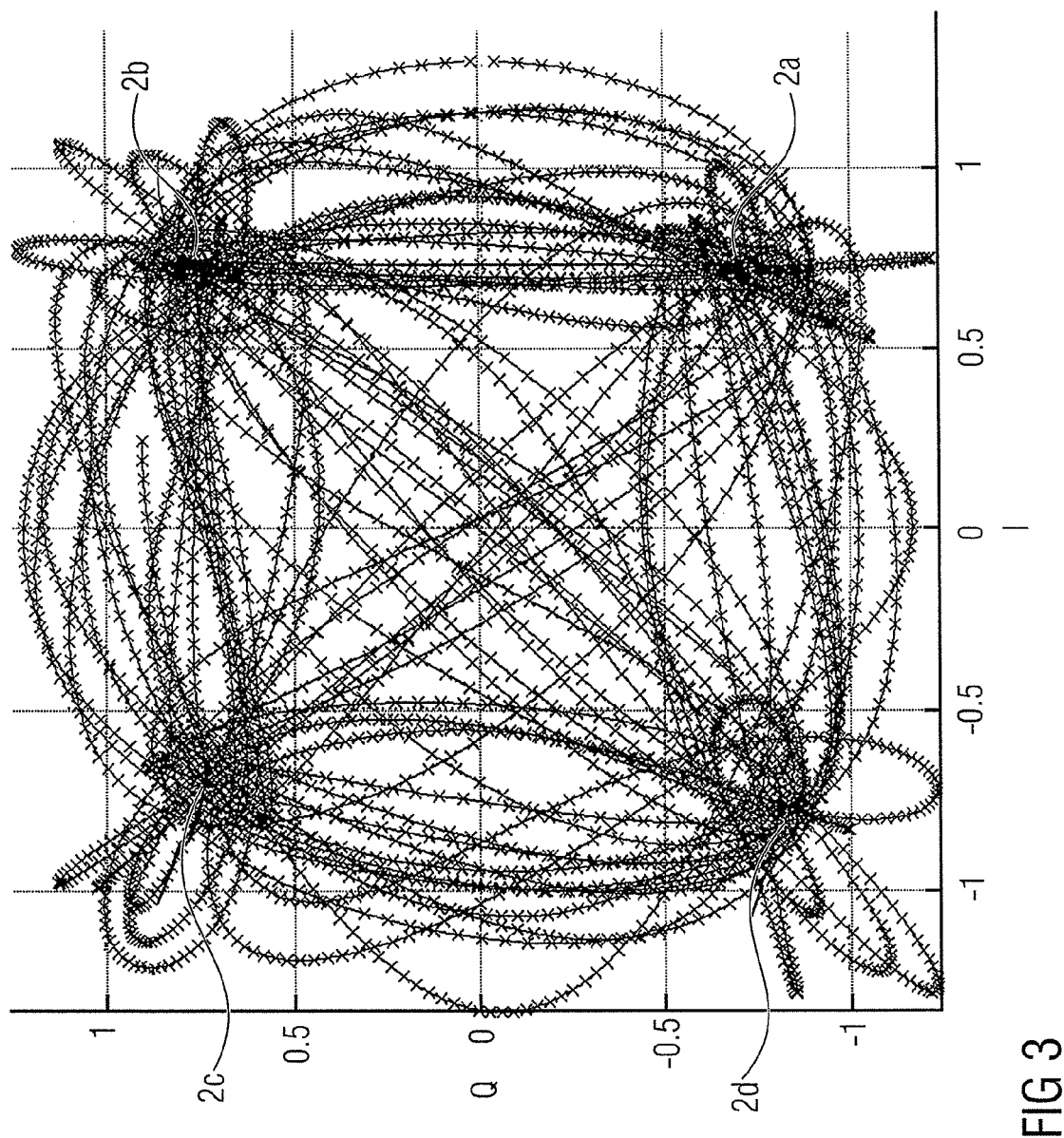
FIG. 3 shows an example of a constitution diagram for a 4PSK modulation.

FIG. 3 shows the trajectories of real implementations which deviate from the idealized trajectory 4 of FIG. 2 due to the effects of the previously discussed signal (pulse) shaping. The trajectory 4 may be sampled with a sampling frequency much higher than the symbol rate (symbol frequency) to synthesize the high frequency signal based on the thus generated super-sampled symbols. FIG. 2 shows a first complex-valued symbol $10a$ and a second complex-valued symbol $10b$ as they may be derived from sampling the trajectory 4. It is noted that the term "symbol" is previously used for the symbols generated at the symbol rate (the symbols corresponding to particular logical information). The points within the constellation diagram which are generated by supersampling the trajectory were named super-sampled symbols. However, this distinction is not necessary for the subsequent description so that all points within the constellation diagram will be called complex valued symbols, including both of the previously described cases.

FIG. 3 illustrates a constellation diagram for a 4PSK modulation as it is retrieved from a practical implementation. The constellation diagram of FIG. 3 shows numerous transitions between the four possible symbols $2a$ to $2d$ of a 4PSK modulation. The transitions are not ideal in the sense of a straight line, but deviate from a straight line due to the pulse shaping of the signals. The diagonal trajectories between the symbols $2d$ and $2b$ or $2c$ and $2a$ may come close to the constellation origin such that the representation of the complex-valued signal defined by those trajectories may exhibit large phase fluctuations in between two complex-valued symbols (as generated by super-sampling the trajectories).

Figure 4:
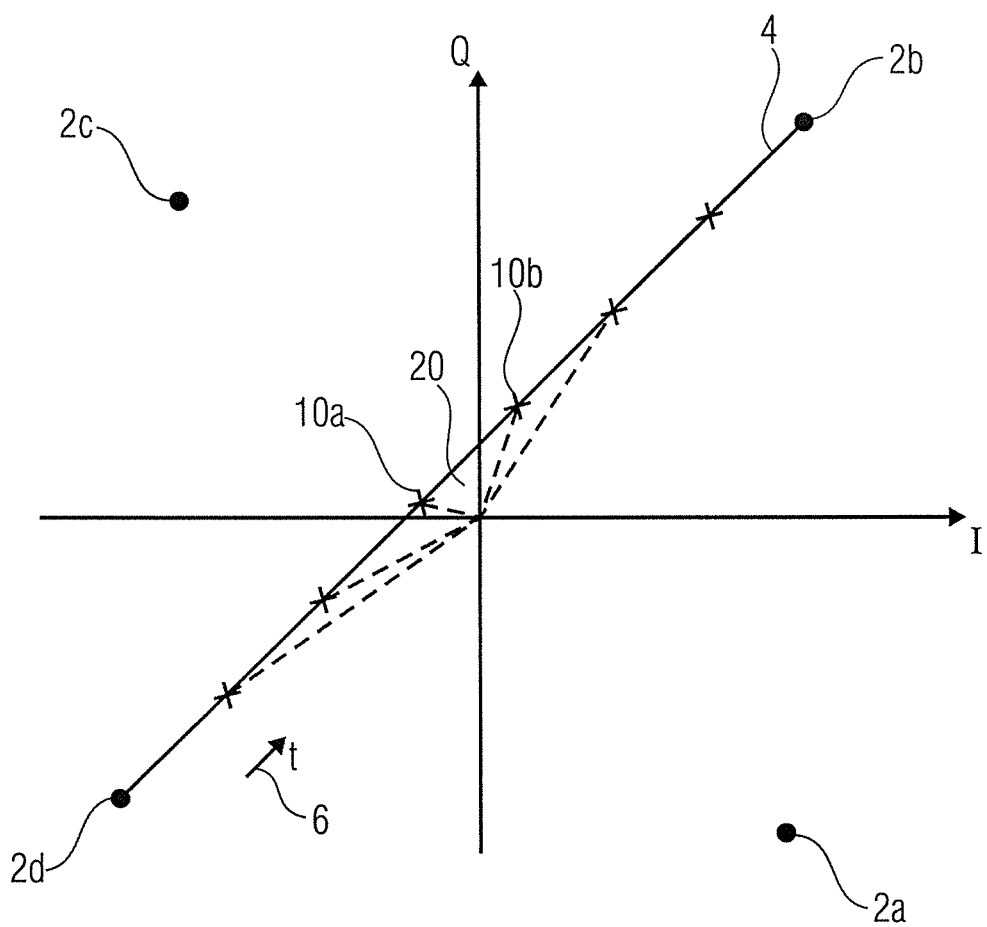
FIG. 4 shows an example trajectory of the constitution diagram of FIG. 3.

FIG. 4 shows a magnification of a trajectory 4 coming close to the constellation origin of the constellation diagram. In more general terms, FIG. 4 shows a representation of a complex-valued signal 4. Numerous complex valued symbols (samples) are illustrated along the representation of the complex-valued signal 4. The relative phase angle 20 between a first complex-valued symbol $10a$ and a second complex-valued symbol $10b$ is the maximum relative phase angle occurring between any neighboring pairs of symbols. That is, the phase might change to an inappropriate or undesirable extent between the symbols $10a$ and $10b$. Thus, sampling a continuous complex-valued signal may provide a sequence of consecutive complex-valued symbols. A relative phase angle between neighboring sampled symbols is a measure for the variation speed of the phase of the complex-valued signal 4. This, in turn, is a measure for the instantaneous frequency of the complex-valued signal, which is generally defined as the time derivative of the variation of the phase, $d/dt\phi(t)$. A measure for the instantaneous frequency of the complex-valued signal of FIG. 4 may, therefore, be derived by dividing the relative phase angle between the first and second complex-valued symbols $10a$ and $10b$ by the sampling time T between the two complex-valued symbols $10a$ and $10b$.

The above described trajectories as they are obtained in real implementations may pose several problems, for example in polar transmitters. In polar transmitters the signal representation in phase and amplitude may not yield band limited signal components even though the signal itself is band limited. This means that the phase signal contains unlimited frequencies and the phase of the signal is not defined in the constellation origin (see for example FIG. 3). This leads to a number of problems:

(1) A special treatment is needed to cope with signal trajectories passing through the constellation origin.
(2) The phase signal is generated in the frequency domain by a local synthesizer, for example a phase locked loop (PLL), however, without any limitation to the phase signal a synthesizer capable of generating infinitely large frequencies would be required; this is technically not realizable.
(3) In a polar transmitter signal chain the phase signal is derived to yield a momentary frequency (or angular velocity) representation of the signal, however, given the non band limited behavior of the phase signal, the representation of the frequency signal in a limited format or medium is not possible without taking special precautions concerning the infinitely high frequencies.
(4) When reconstructing the continuous signal trajectory from the sampled data in the polar coordinate system, the bandwidth criteria of the individual signal components (R/phi) are not met, thus the reconstruction of the trajectory is more error prune.

In view of the above issues, when designing a polar transmitter action needs to be taken to circumvent the problem in the phase/frequency and radius parts of the signal. The unlimited dynamic range of the angular velocity needs to be dealt with. This may be achieved by limiting the maximum angular velocity of the signal, without violating the requirements of the transmitted signal, which may be referred to as a frequency limiting procedure or a frequency saturation procedure.

In many wireless communication systems, for example UMTS/LTE/WLAN, the transmit signal is defined in the I/Q domain, and a polar transmitter architecture in such systems may contain a Cartesian to polar conversion algorithm, for example, called cordic. The frequency limitation problem may either be addressed in the I/Q domain or in the phase/amplitude domain or some combination thereof. In the phase/amplitude domain it is simple and straight forward to calculate and limit the angular velocity, however, it is difficult to do so without violating the transmission requirement of the given communication system. In the I/Q domain it is easier to modify the signal in a controlled manner with respect to signal impairments and spectral behavior, however, it is more difficult to control the angular velocity. Any means of altering the signal in order to bound the bandwidth or magnitude of the phase/angular velocity and/or the radius of the transmit signal will impair the transmitted signal quality. Thus, for example when designing a polar transmitter it is desired to find the polar signal bounding means which minimizes the impact on the transmission quality, for example EVM (Error Vector Magnitude), ACLR (Adjacent Channel Leakage Power Ratio), duplex distance noise or any other relevant metric.

Figure 5:
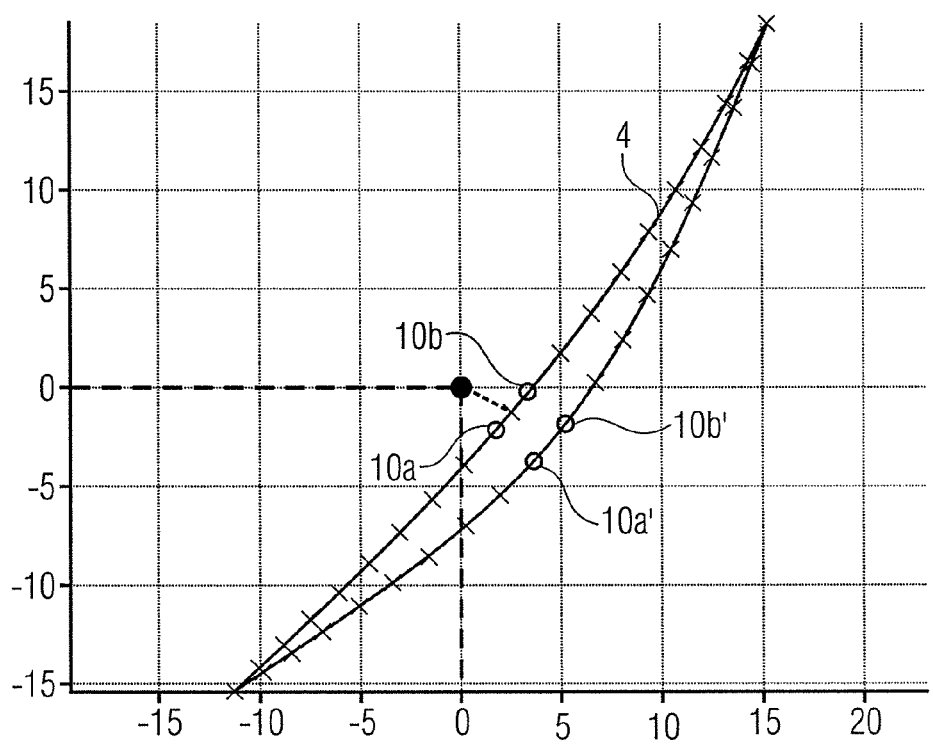
FIG. 5 shows an original trajectory, similar to the one of FIG. 4, which, for implementing a frequency limitation, is shifted away from the constellation origin.

So far, one approach for frequency limitation is detecting or predicting frequency maxima in the I/Q signal, wherein frequency maxima occur where the signal passes through or close by the constellation origin. By adding a pulse perpendicular to the trajectory direction, for example centered at a frequency maximum, the frequency of the signal is locally limited. This can for example be done by adding a pulse after the pulse shaped signal. Or in the case of predicting frequency maxima by shifting the symbols to be transmitted before the pulse shaping such that the resulting trajectory will not pass so close to the constellation origin. FIG. 5 shows the basic idea of frequency limitation of an I/Q signal. In a similar way as in FIG. 4, FIG. 5 shows an original trajectory 4 which, for implementing the frequency limitation, is shifted away from the constellation origin, as is shown at 4'. The trajectory 4' results in a more limited frequency when compared to the trajectory 4, wherein the pulse shape applied to the trajectory defines the spectral behavior of the frequency limited signal. When shifting the original trajectory 4 in a way as shown in FIG. 5, one has to take care not to violate the transmission requirements of the relevant communication system as due to the required smooth signal trajectory the shifted trajectory 4' deviates from the original trajectory 4 for a significant amount of time.

Figure 6A:
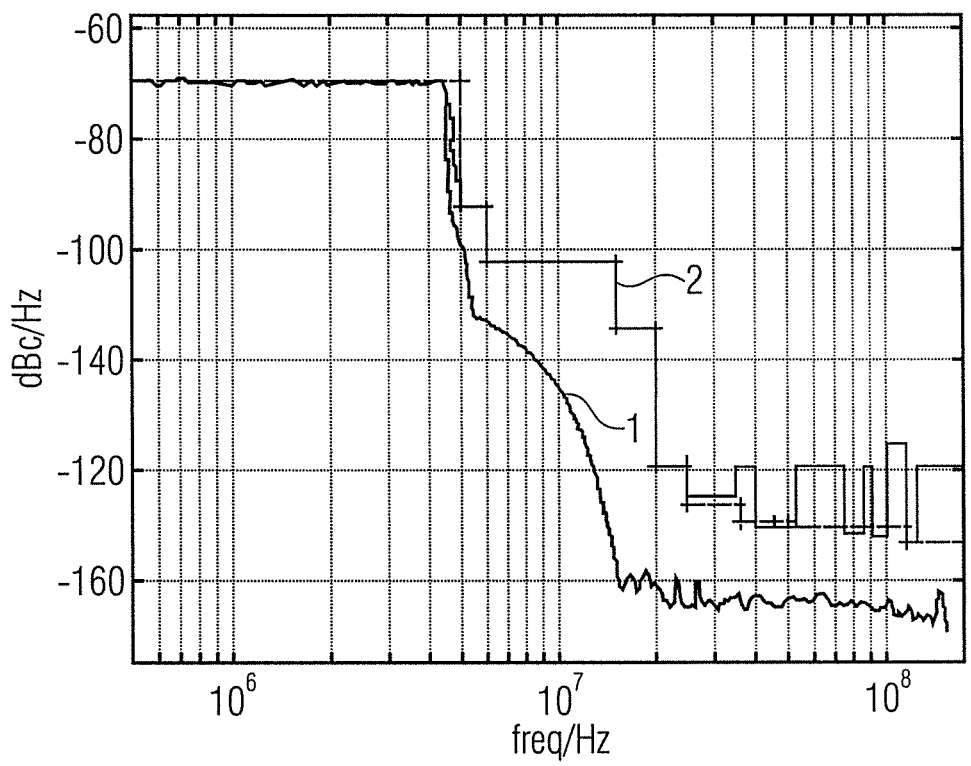
Figure 6B:
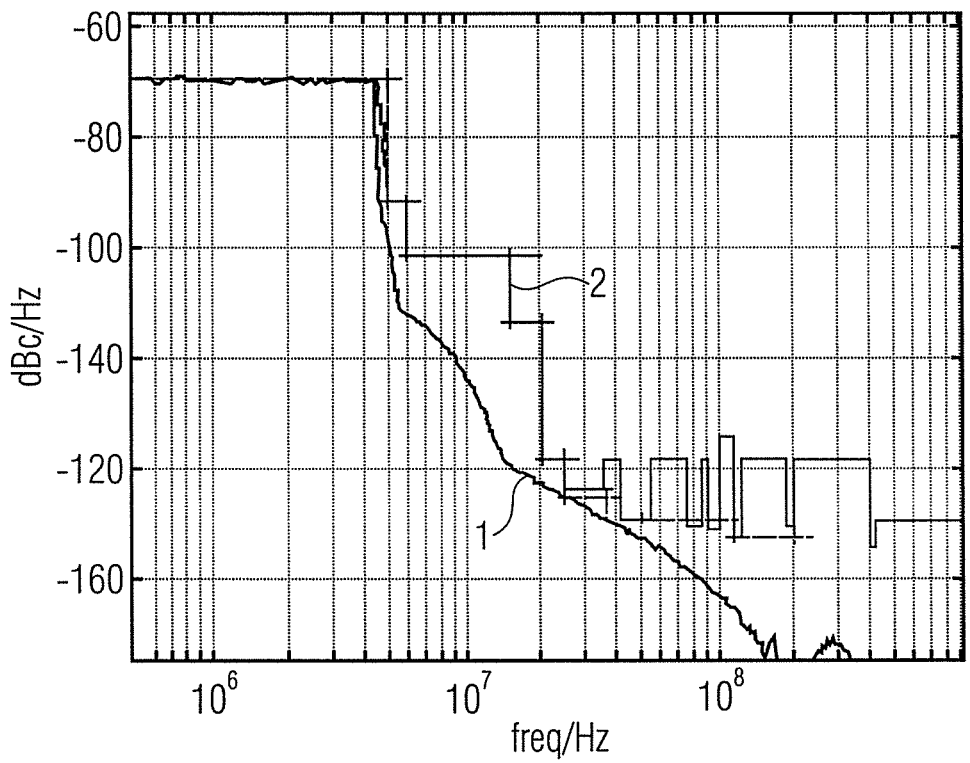

There is a general tradeoff in the above described approach between the amount of added error energy (resulting in the shifted trajectory 4'), which degrades the signal quality, and the maximum angular velocity of the resulting signal. Basically, one can trade higher EVM against tighter frequency bounds. The above described approach is sufficient in limiting the maximum angular velocity, however, it does not address the bandwidth of the angular velocity and the radius representation of the signal, raising problems for the interpolation of the sampled signal. For example, for high bandwidth communication standards, like LTE10, 15 and 20, WLAN, the noise introduced by the interpolation of the sampled signal becomes increasingly dominant. An example of the interpolation noise contribution is visualized in FIGS. 6A-6B. FIGS. 6A-6B show the simulated spectrum (see curve 1) of an LTE10 signal in a polar transmitter architecture. FIG. 6A shows the spectrum before interpolating the R/phi signal, and FIG. 6B shows the spectrum after interpolation of the R/phi signal. As can be seen from a comparison of FIGS. 6A and 6B, the interpolation contribution to the noise is dominant at an offset of more than 25 MHz. As can be seen from FIGS. 6A-6B, this interpolation contribution to the noise is also critical to the spectrum mask depicted by curve 2 in FIGS. 6A-6B.

Figure 7:
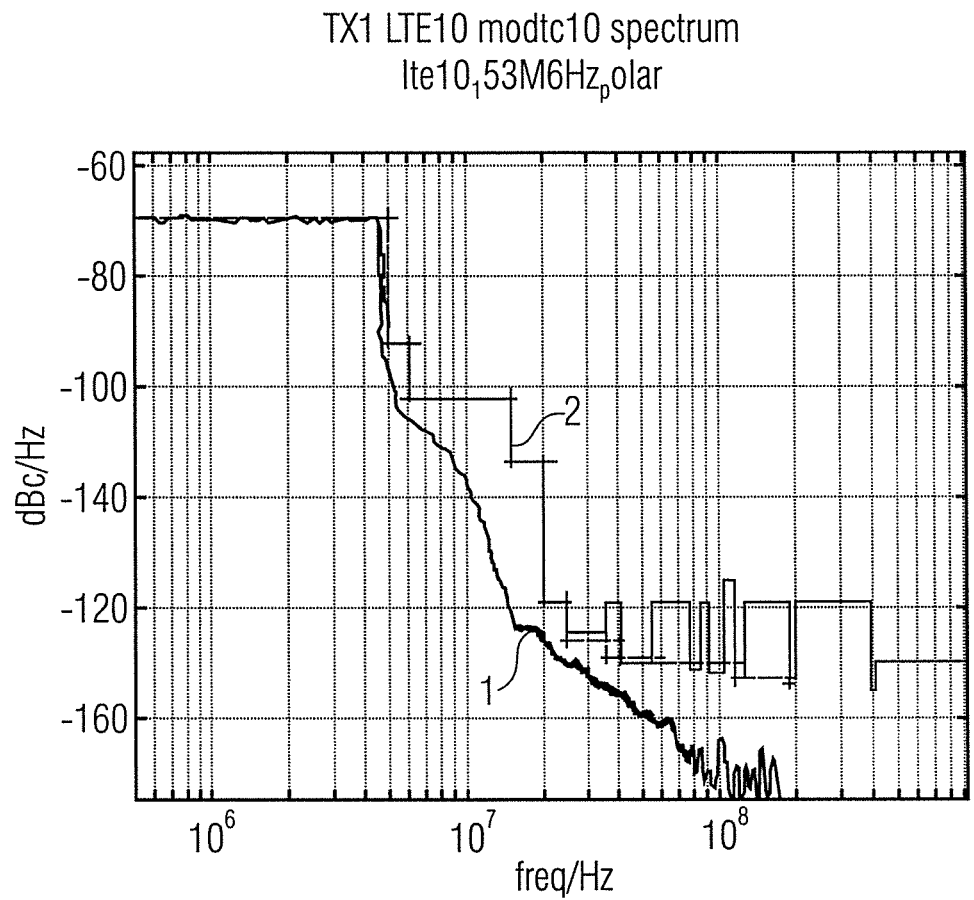
FIG. 7 shows an example of the EVM/noise performance tradeoff.

FIG. 7 shows an example of the EVM/noise performance tradeoff. The simulation used much lower frequency limits than the simulation based on which the spectrum of FIGS. 6A-6B was generated. The tradeoff is visualized by comparing FIGS. 6A-6B and 7, and in FIG. 7 a lower frequency limit has been used which resulted in better noise performance above 25 MHz, however, resulted in a significantly higher EVM as well as worse ACLR values. The above mentioned tradeoff is limiting the reachable performance of a given polar transmitter architecture. The interpolation error gets smaller as the sampling rate of the Cartesian polar conversion increases. To keep the interpolation error below the emission spectrum mask (see curve 2 of FIGS. 6A-6B and 7) the conversion to polar coordinates has to be performed at a high enough frequency. However, the higher the frequency, the higher the current consumption, and therefore it is of interest to keep the conversion on a low data rate. Further, there are limits on the data rate introduced by the technology used for an integrated circuit implementing the necessary circuitry for processing the above mentioned signal.

Yet another problem of frequency limiting by means of adding perpendicular pulses is emerging when using dual channel communication systems, such as HSPA+ (High Speed Packet Access). If two channels are shifted with half the carrier spacing and added together before being transmitted, problems may arise if the two channels are highly correlated over a period of time. In the extreme case, the signals may be equal and the combined signal will pass through the constellation origin with a periodicity of the channel spacing frequency. For UMTS systems, this might occur if both channels have a very low data rate. In such a scenario, to limit the angular velocities by altering the signal trajectory to run farther from the constellation origin, a large error energy needs to be added to the signal.

To deal with the above mentioned problems, a method for modifying a complex-valued signal representing a first symbol and a second symbol is provided, wherein a signal trajectory of the complex-valued signal between the first and second symbols is determined, and, if the signal trajectory passes nearby the constellation origin, the signal trajectory is altered to run closer to the constellation origin. It may also be said that the signal trajectory is pulled towards the constellation origin. The passing of the signal trajectory nearby the constellation origin may be determined when a predefined characteristic of the signal trajectory fulfills a predefined first criterion. The predefined characteristic of the signal trajectory may comprises at least one of a relative phase angle between the first and second symbols, a momentary frequency of the complex-valued signal and a distance, e.g. the Euclidian distance, between the signal trajectory and a constellation origin, and the signal trajectory may be altered to run closer to the constellation origin, if the predefined characteristic of the signal trajectory fulfills the predefined first criterion. Further, it may be determined whether the predefined characteristic of the signal trajectory fulfills a second criterion, and if the predefined characteristic of the signal trajectory fulfills the second criterion, but not the first criterion, the signal trajectory may be altered to run farther from the constellation origin.

Figure 8:
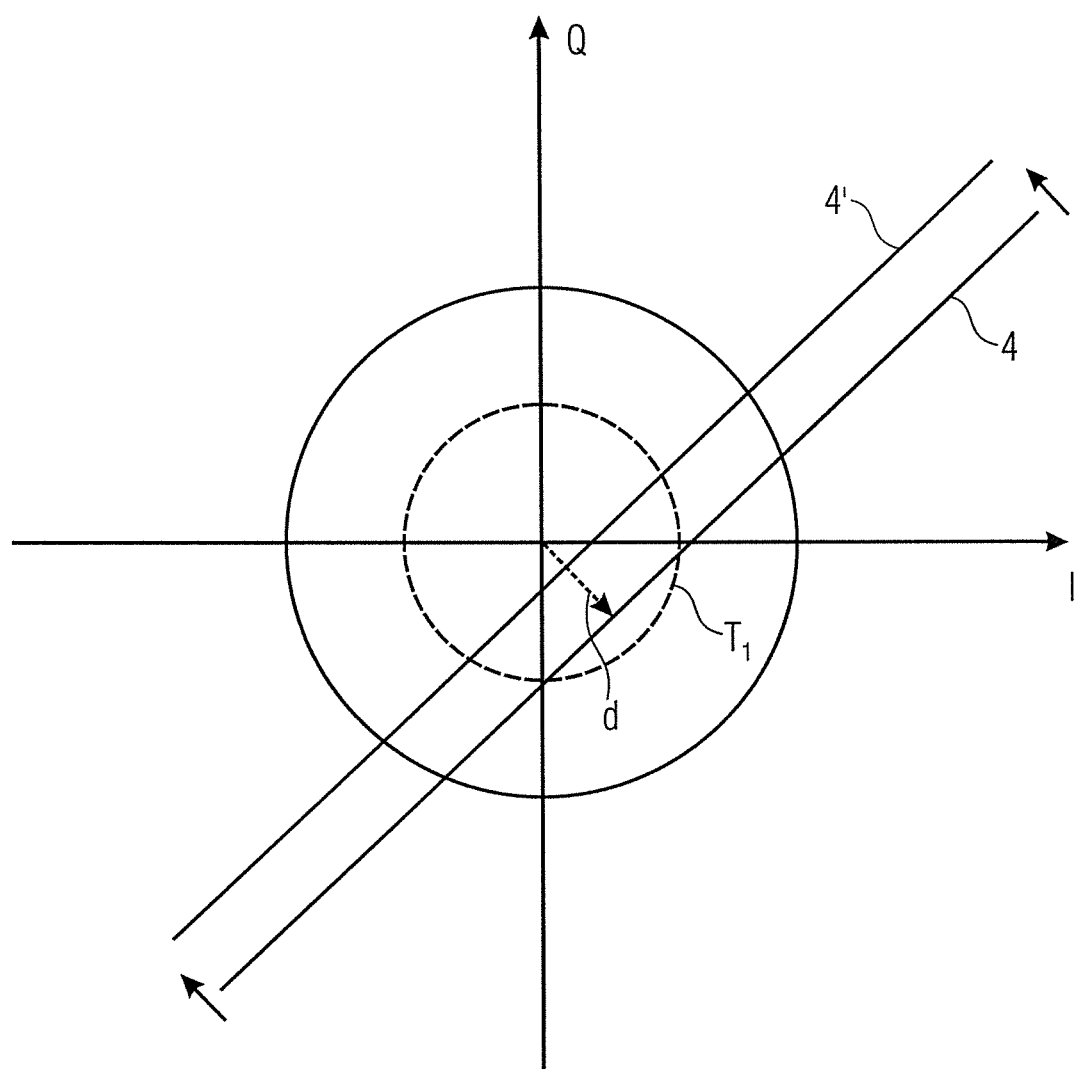
FIG. 8 shows a simplified constellation diagram, similar to the ones shown in FIGS. 2 and 4, illustrating altering the signal trajectory to run closer to the constellation origin.
Figure 9:
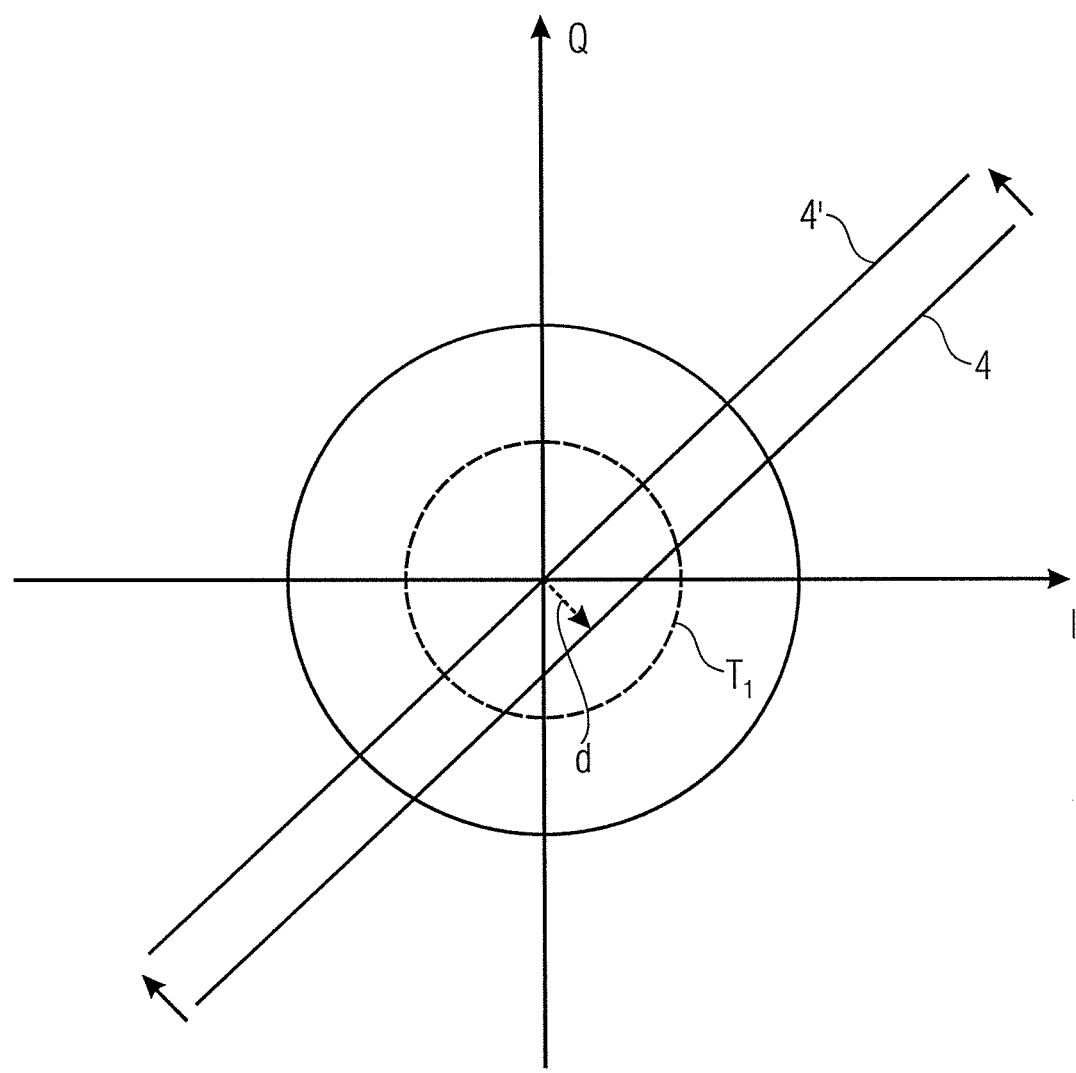
FIG. 9 shows a constellation diagram similar to FIG. 8 except that the original trajectory is altered to run through the constellation origin.

FIG. 8 shows a simplified constellation diagram in a similar way as FIGS. 2 and 4. FIG. 8 shows the original trajectory 4 of the complex-valued signal and the distance d by which the original trajectory 4 passes the constellation origin of the constellation diagram, in FIG. 8 the constellation origin of the I/Q coordinate system. In FIG. 8, the first criterion is that the distance is less than a predefined value, as it is for example depicted by the dotted circle $T_1$, and if it is determined that the distance of the trajectory 4 is less than the threshold $T_1$, the trajectory is altered such that the resulting trajectory runs by a predefined distance closer to the constellation origin, as is depicted by the modified signal trajectory 4'. As can be seen, the modified trajectory 4' passes the constellation origin closer than the original trajectory 4. The predefined distance may depend on the subsequent processing of the complex-valued signal. The amount by which the original trajectory 4 may be moved towards the constellation origin is selected such that the modified complex-valued signal represented by the trajectory 4' can be processed in accordance with the processing capabilities of a signal processing stage receiving the modified complex-valued signal. Alternatively, instead of altering the trajectory 4 to run by a predefined distance closer to the constellation origin as is depicted in FIG. 8, the signal trajectory 4 may also be altered such that it passes through the constellation origin. FIG. 9 shows a constellation diagram similar to FIG. 8 except that in this example the original trajectory 4 has been altered in such a way that the modified trajectory 4' passes through the constellation origin.

Figure 10:
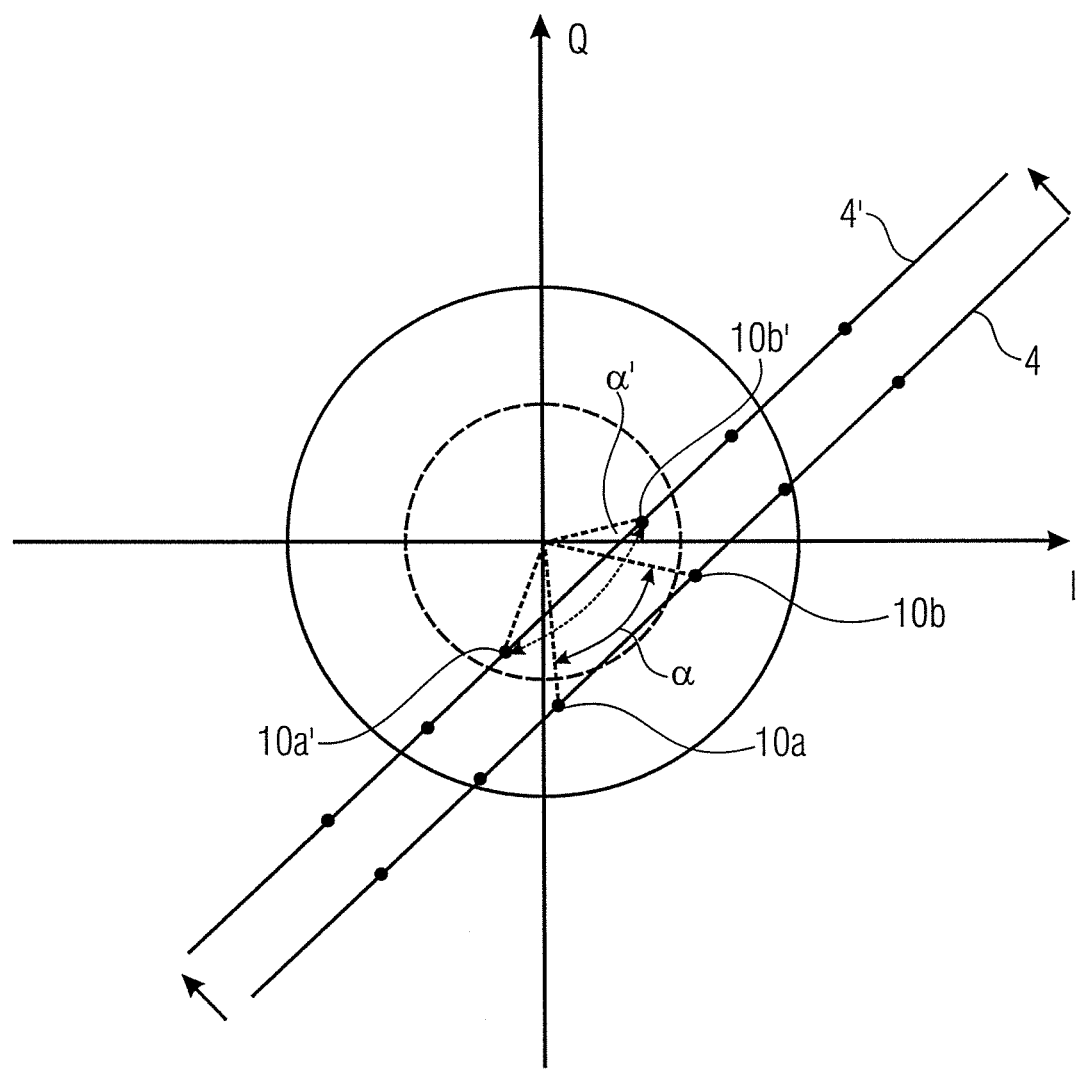
FIG. 10 shows a constellation diagram similar to FIG. 8, showing the relative phase angles between the respective complex-valued symbols.

The distance d mentioned above with regard to FIGS. 8 and 9 may be determined based on a predetermined signal characteristic and the first criterion comprises a predefined value of this signal characteristic. The predefined value of the signal characteristic may be set based on the signal processing capabilities of a signal processing stage receiving the modified complex-valued signal, and the signal characteristic may comprise a relative phase angle between the first and second symbols or a momentary frequency of the complex-valued signal. FIG. 10 shows a constellation diagram similar to FIG. 8, wherein in addition the respective complex-valued symbols are shown of which symbols 10a and 10b are indicated with regard to the original trajectory 4. In the example of FIG. 10, the relative phase angle α between symbols 10a and 10b is indicated, and based on this angle α the distance of the signal trajectory 4 is determined, more specifically it is determined whether the relative phase angle α is more than a predefined phase angle threshold, for example is more than 45° and is less than a further threshold which may be less than 135°. The values for the phase angle α depend on the processing capabilities of the subsequent processing stages, for example a phase locked loop has a limited frequency range to operate on. In FIG. 10 it is assumed that the phase angle α does not fulfill the criterion so that the trajectory 4 is altered to run closer to the constellation origin as it is depicted by modified trajectory 4' and the modified symbols 10a' and 10b'. This results in a phase angle α' which is outside the range between the first and second phase angle thresholds and is larger than the original phase angle α, which as shall be described in further detail can be processed by the subsequent processing stages.

Alternatively, altering of the trajectory 4 may be decided based on a momentary frequency of the signal and if the momentary frequency exceeds a frequency threshold, the trajectory 4 is altered to run closer to the constellation origin as shown in FIG. 10.

Figure 11:
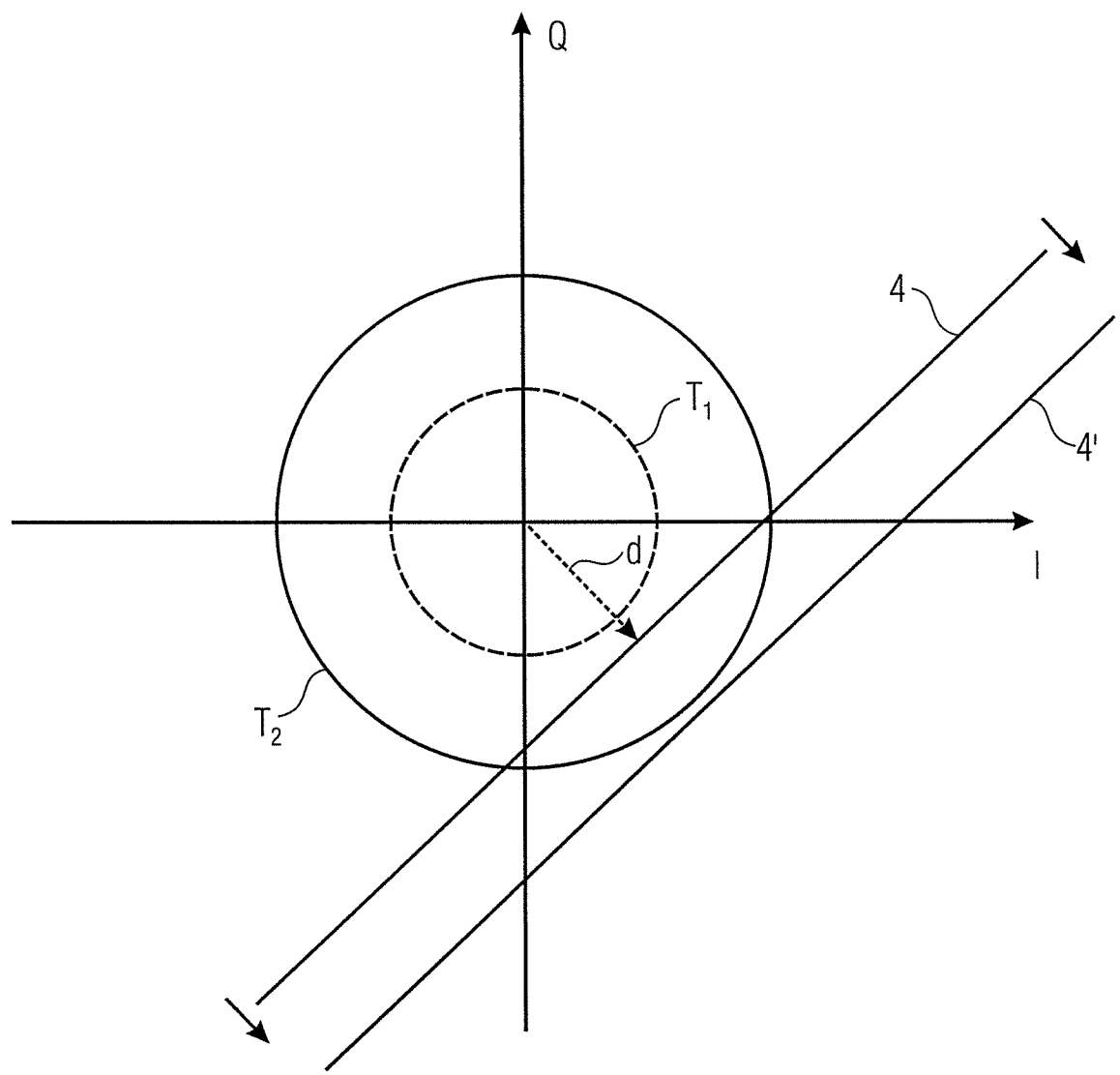
FIG. 11 shows an example in accordance with which the error that is introduced by modifying the original trajectory is minimized by altering the signal trajectory.

As mentioned above, altering the trajectory 4 to a different position with regard to the constellation origin introduces, with regard to the respective values 10a and 10b (see FIG. 10), a corresponding error based on the amount by which the trajectory 4 is altered. FIG. 11 shows an example in accordance with which the error that is introduced by modifying the original trajectory is minimized when compared to known approaches which have been described above which only provide for altering the trajectory to run farther from to the constellation origin. It may also be said that the signal trajectory is pulled or pushed away from the constellation origin. In FIG. 11 a situation similar to FIG. 8 is shown, however, in addition to the first threshold $T_1$ a second threshold $T_2$ is depicted. If the original trajectory 4 has a distance within the second criterion or threshold $T_2$ it is further determined whether the first threshold $T_1$ is met or not. In FIG. 11 a situation is depicted where the distance is greater than the first threshold $T_1$, and in this situation the trajectory 4 is altered to run farther from the constellation origin as is depicted by modified trajectory 4'. The signal trajectory may be altered in such a way that the modified complex-valued signal can be processed in accordance with the processing capabilities of a subsequent signal processing stage receiving the modified complex-valued signal. In the example depicted in FIG. 11, the criteria are set in such a way that when altering the signal trajectory to run closer to or farther from the constellation origin, substantially the same amount of change of the complex-valued symbols is required, thereby introducing substantially the same error into the signal. However, when compared to approaches where the signal trajectory 4 is only altered to run farther from the constellation origin, the amount of error introduced can be reduced as in a situation where the trajectory fulfills threshold $T_1$, it is altered to run closer to the constellation origin so that the error amount is less than the error amount that would be introduced when altering the signal trajectory to a position as it is depicted at 4' in FIG. 11. The above described altering of the signal trajectory to run closer to or farther from the constellation origin may be done by combining at least one of the first and second symbols 10a, 10b with an enhancement pulse. The shifting may also be done by an appropriate pulse shaping or the like.

In the following, an apparatus for modifying the complex-valued signal in a way as described above with regard to FIGS. 8 to 11 will be described in further detail with regard to a complex-valued signal being a polar signal (see FIG. 12) or a complex-valued signal being an /Q signal (see FIG. 13).

Figure 12:
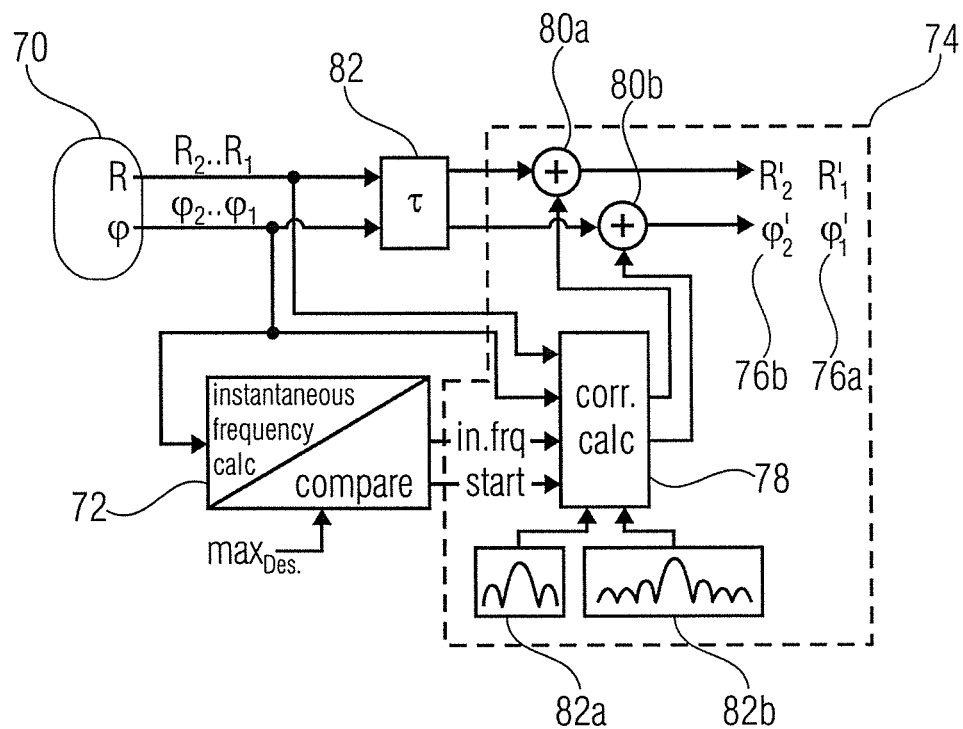
FIG. 12 shows an apparatus for modifying the characteristic of a representation of a complex-valued signal represented by polar coordinates.

FIG. 12 shows an apparatus for modifying the characteristic of a representation of a complex-valued signal 70, which comprises at least a first and a second complex-valued symbol. The complex-valued signal 70 is represented by polar coordinates, the magnitude R and the phase φ both represented by two independent real-valued functions. The phase component of the representation of the complex-valued signal 70 is input into an analyzer which is adapted to derive the relative phase angle between a representation of a first complex-valued symbol (R1, φ1) and of a second complex-valued symbol (R2, φ2) of the representation of the complex-valued signals 70. The analyzer 72 steers a signal enhancer 74, which is adapted to combine a representation of a complex-valued enhancement pulse with the representation of the complex-valued signal 70 to provide a representation of a first and a second corrected symbol 76a and 76b (R1', φ1' and R2', φ2'), wherein the enhancement pulse is chosen as described above. The analyzer 72 may comprise a comparator in order to determine whether the relative phase angle exceeds a predetermined threshold. Alternatively, an instantaneous or momentary frequency may be estimated and compared with a frequency threshold. The instantaneous frequency may be estimated by dividing the relative phase angle by the sampling time.

The signal enhancer 74 is controlled by the analyzer 72, which outputs a start signal when a correction is required together with the determined relative phase angle or instantaneous frequency. The signal enhancer 74 comprises a correction calculator 78, which calculates the enhancement pulses which are to be applied to the R and φ components of the representation of the complex-valued signal. In order to be able to choose an appropriate representation of a complex-valued enhancement pulse (to choose different real-valued pulses for each of the signal component R and φ), the correction calculator 78 of the signal enhancer 74 receives copies of the representation of the complex-valued signals.

The correction calculator 78 may choose from or individually derive different enhancement pulses, depending on the properties of the two complex-valued symbols having a relative phase angle exceeding the predetermined threshold. The signal enhancer 74 further comprises a first adder 80a and a second adder 80b, in order to combine the representation of a complex-valued enhancement pulse (its R and φ components) and the representation of the complex-valued signal 70 (its R and φ components). Thus, the representations of a first and second corrected symbol 76a and 76b may be provided by the signal enhancer 74. An optional delay unit 82 may buffer the representation of the complex-valued signal 70 for a time used by the calculations performed by the signal analyzer 72 and the signal enhancer 74.

FIG. 12 illustrates two different pulse shapes of enhancement pulses 82a and 82b, from which the correction calculator 78 may choose according to one embodiment. It goes without saying that these are mere examples and that the signal enhancer 74 (the correction calculator 78) may appropriately choose from a plurality of enhancement pulses. Different enhancement signals may also be generated in situ, for example based on one single prototype pulse. Also, depending on the number of required enhancement pulses, the duration of the enhancement pulse may be varied as also indicated previously.

Figure 13:
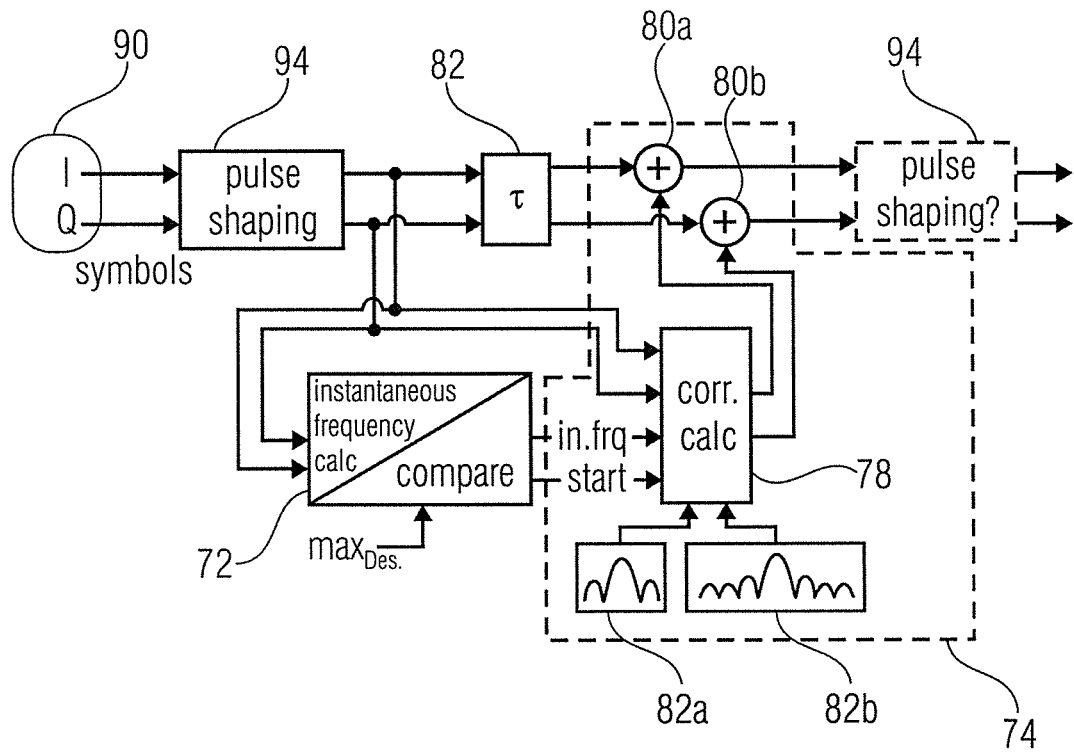
FIG. 13 shows an apparatus for modifying the characteristic of a representation of a complex-valued signal represented by I/Q coordinates.

FIG. 13 shows an apparatus for modifying the characteristic of the representation of a complex-valued signal, in a similar way as in FIG. 12, however, the complex-valued signal is provided by an I/Q representation 90. The apparatuses of FIGS. 12 and 13 are similar and only the differences will subsequently be described. The major difference to FIG. 12 is that the signal analyzer 72 receives both components of the representation (I and Q) as an input, as both components are required in order to evaluate a relative phase angle between neighboring symbols of the representation of the complex-valued signal 90. The apparatus of FIG. 13 may additionally comprise pulse shapers 94 in order to modify the two components I and Q of the representation before modulating the high-frequency carrier in order to provide for the smooth transitions between the individual symbols. The pulse shaping may be implemented prior to the signal enhancer 74 or, alternatively, after the signal enhancer 74.

When using an apparatus as described above with regard to FIG. 12 or 13 in a mobile communication devices (see e.g. FIG. 1) they may be implemented within a transceiver, and the output of the apparatuses may be used as an input to a high-frequency modulator, such as an R/φ or an I/Q modulator.

In the following, an example of a transmitter architecture will be described in further detail. In such a transmitter architecture, a frequency limiter block may be provided which provides for the possibility of not only altering the signal to run farther from the constellation origin, but when appropriate also for altering it to run closer to the constellation origin (see FIG. 11), thereby producing zero crossings. The frequency limiter block may comprise an apparatus as described above with respect to FIGS. 12 and 13. When the I/Q signal trajectory passes close to the constellation origin (resulting in a high angular velocity), the frequency limiter or a stand alone arithmetic unit adds a pulse to the I/Q signal. The pulse is scaled such that the signal passes through or very close to the constellation origin. The definition that the signal passes "very close" to the constellation origin may be defined to be when the maximum phase difference of two consecutive I/Q samples (e.g. samples 10a, 10b), when passing by the constellation origin, is greater than (p−phi_lim) radians, where phi_lim corresponds to the desired frequency limit. This algorithm, as described with regard to FIG. 11, may be combined with a known frequency limiter described above so that the signal trajectory can be altered to run closer to or to run farther from the constellation origin, based on the above mentioned criteria. One criterion may be the maximum angular velocity of the original signal, and for large angular velocities the trajectory is altered to run closer to the constellation origin, and for moderate angular velocities the trajectory is altered to run farther from the constellation origin. It is noted that other, more complex decision criteria may also be used.

The signal leaving the frequency limiter shows phase differences close to 180° or −180° when a zero crossing occurs or when the signal passes very close to the constellation origin. This phase jump can be easily detected, for example after converting the signal to polar coordinates. In such a situation, a zero crossing can be detected by detecting any phase difference of two consecutive samples (e.g. samples 10a, 10b) to be e.g. greater than 90° or smaller than −90°. This may be done before or after differentiating the phi signal. When a zero crossing is detected, 180° is added to the phi signal (or the equivalent in the frequency domain) and the sign of the radius signal is toggled. The 180° jump of the zero crossing results in a sign change in the radius path, which, however, does not change the signal trajectory.

Figure 14:
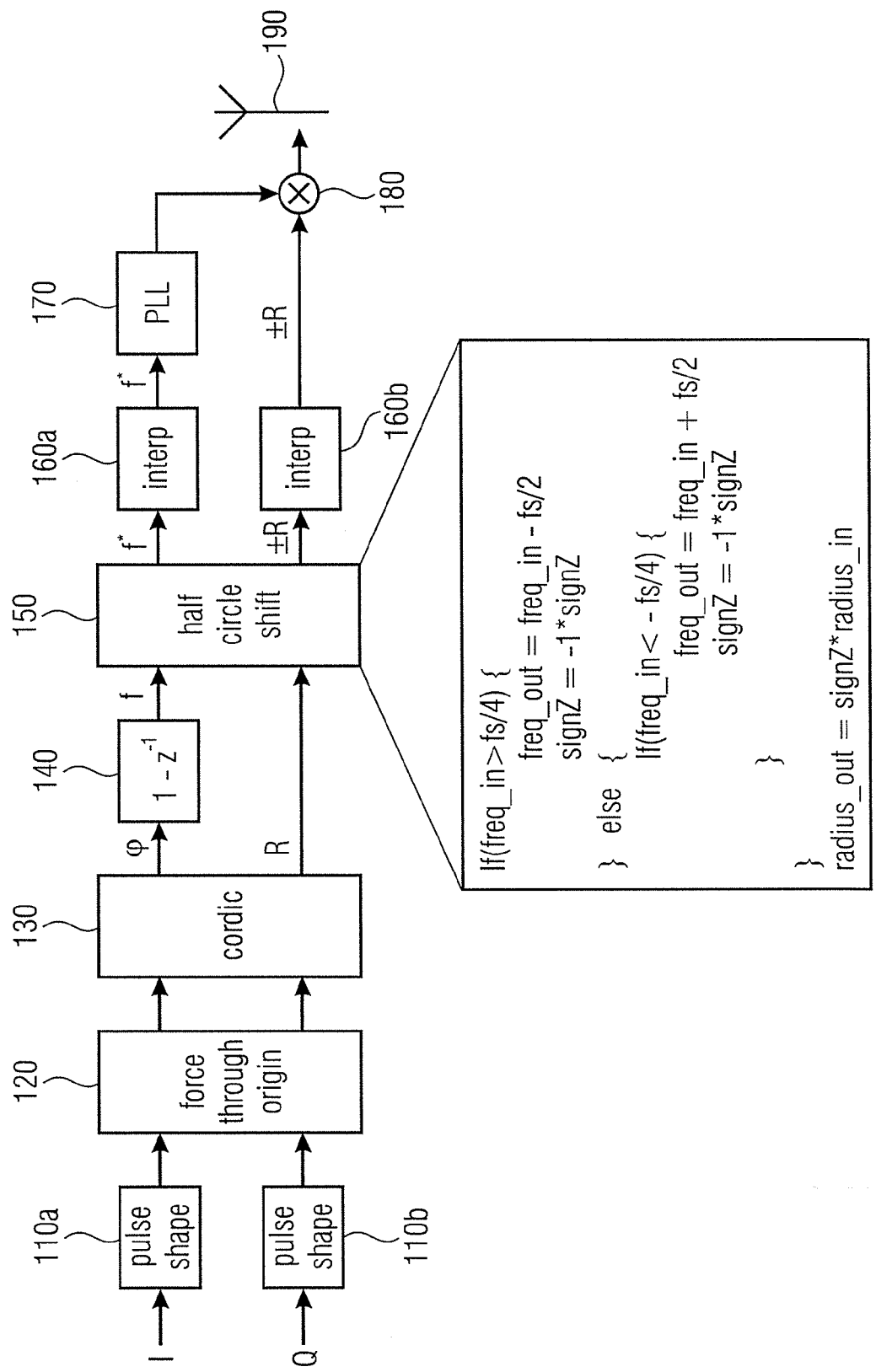
FIG. 14 shows a simplified block diagram of a polar transmitter for altering the signal trajectory of an input signal to run closer to or farther from the constellation origin.

FIG. 14 shows a simplified block diagram of a polar transmitter configured to alter the signal trajectory of an input signal to run closer to or farther from the constellation origin in a way as described above. FIG. 14 shows the polar transmitter architecture 100 receiving as a first input signal the I-component of a baseband signal and as a second input signal the Q-component of the baseband signal. The two input signals are applied to respective pulse shapers 110a and 110b. The pulse-shaped input signals are applied to the frequency limiter block 120 operating in accordance with the above described algorithm for forcing a signal trajectory of the input signal either towards the constellation origin or away from the constellation origin. In one example, it is only desired to allow forcing the signal trajectory towards the constellation origin when applicable, i.e. when a predefined criteria of the signal is fulfilled. In another example, the frequency limiter block 120 may also include a "shared" frequency limiter allowing to alter the input signal trajectory to run farther from the constellation origin when applicable, as described above. The modified I-signal and Q-signal output by the frequency limiter block 120 are input into a cordic algorithm block 130 for generating the polar coordinates R, φ. In the example shown in FIG. 14, the angular coordinate φ is transformed by means of block 140 into the frequency domain so that, at the output of block 140, a frequency signal exists. The transmitter comprises a frequency peak detector 150 receiving the frequency signal from the block 140 and determining in accordance with the algorithm depicted in FIG. 14 a zero crossing in the frequency domain and causing, based on whether a zero crossing occurred or not, to toggle the sign of the radius coordinate R. It is noted that in other examples, the zero crossing detection may not be done in the frequency domain but is done in the phase domain, and in such examples block 140 can be omitted.

The output signals of the frequency peak detector 150 with radius sign toggling are input to respective interpolator stages

160a and 160b, wherein the interpolated frequency signal output by block 160a is input into a phase locked loop 170, and the output of the PLL 170 and the output of the interpolator 160b are input into a mixer 180 for generating an output signal to be applied to an antenna 190 for transmission over the air interface. The mixer 180 may be a mechanism able to deal with the signed radius, for example an RF DAC which can handle the negative values that may be provided by the interpolator 160b.

When compared to the above mentioned known approaches, the described procedure has the following advantages:
1) The mean pulse energy introduced by the frequency limiter can be reduced, since one can choose to alter the trajectory to run closer to or to run farther from the constellation origin, depending on which requires the smallest pulse amplitude. Simulations show that the EVM and ACLR contributions of the frequency limiter are reduced also for standard UMTS cases, when allowing the frequency limiter to alter the trajectory to run through the constellation origin.
2) The phase/frequency—and the radius—signals have a reduced number of high frequency components when compared to the original signal and therefore are easier to interpolate.

Figure 15A:
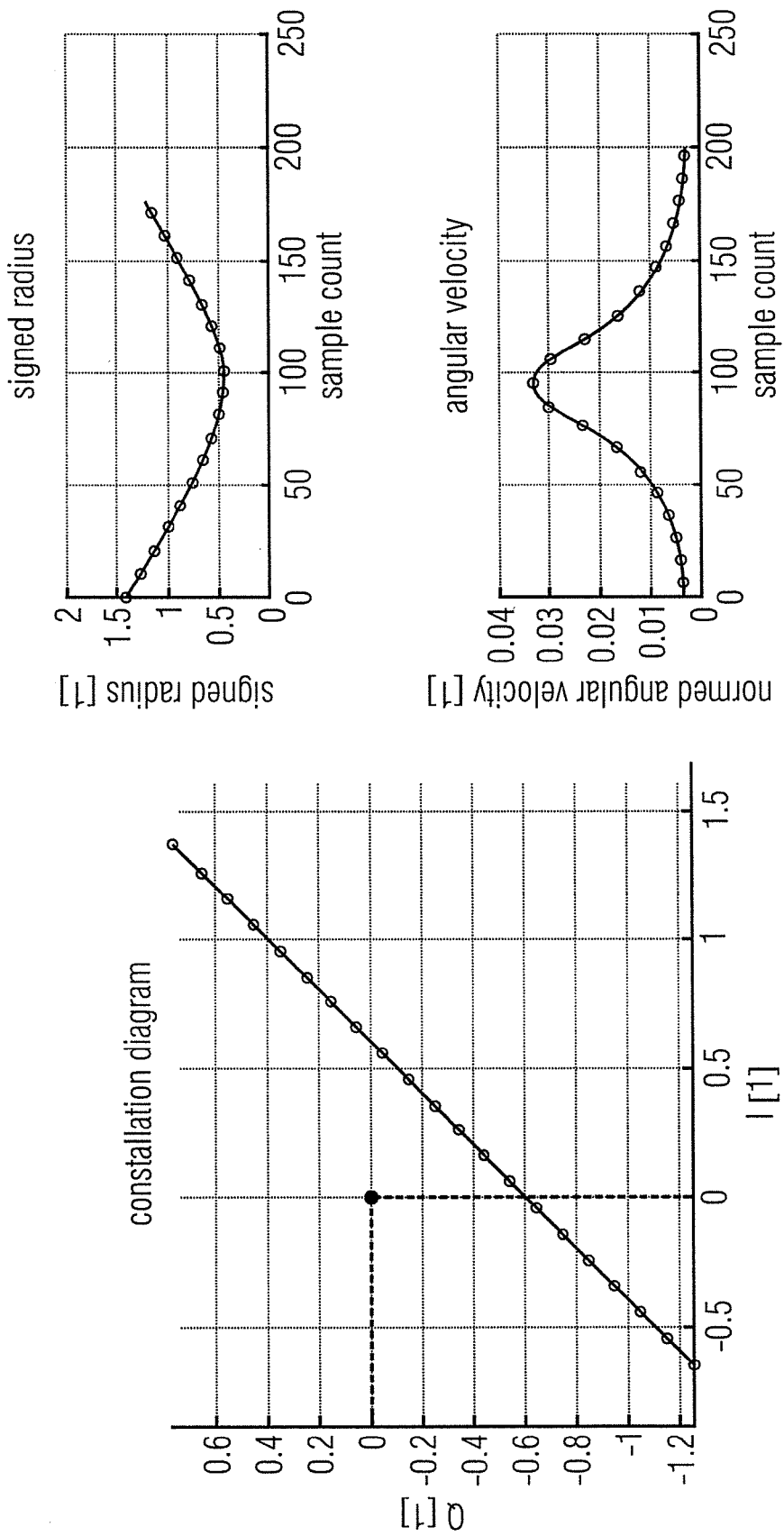
Figure 15B:
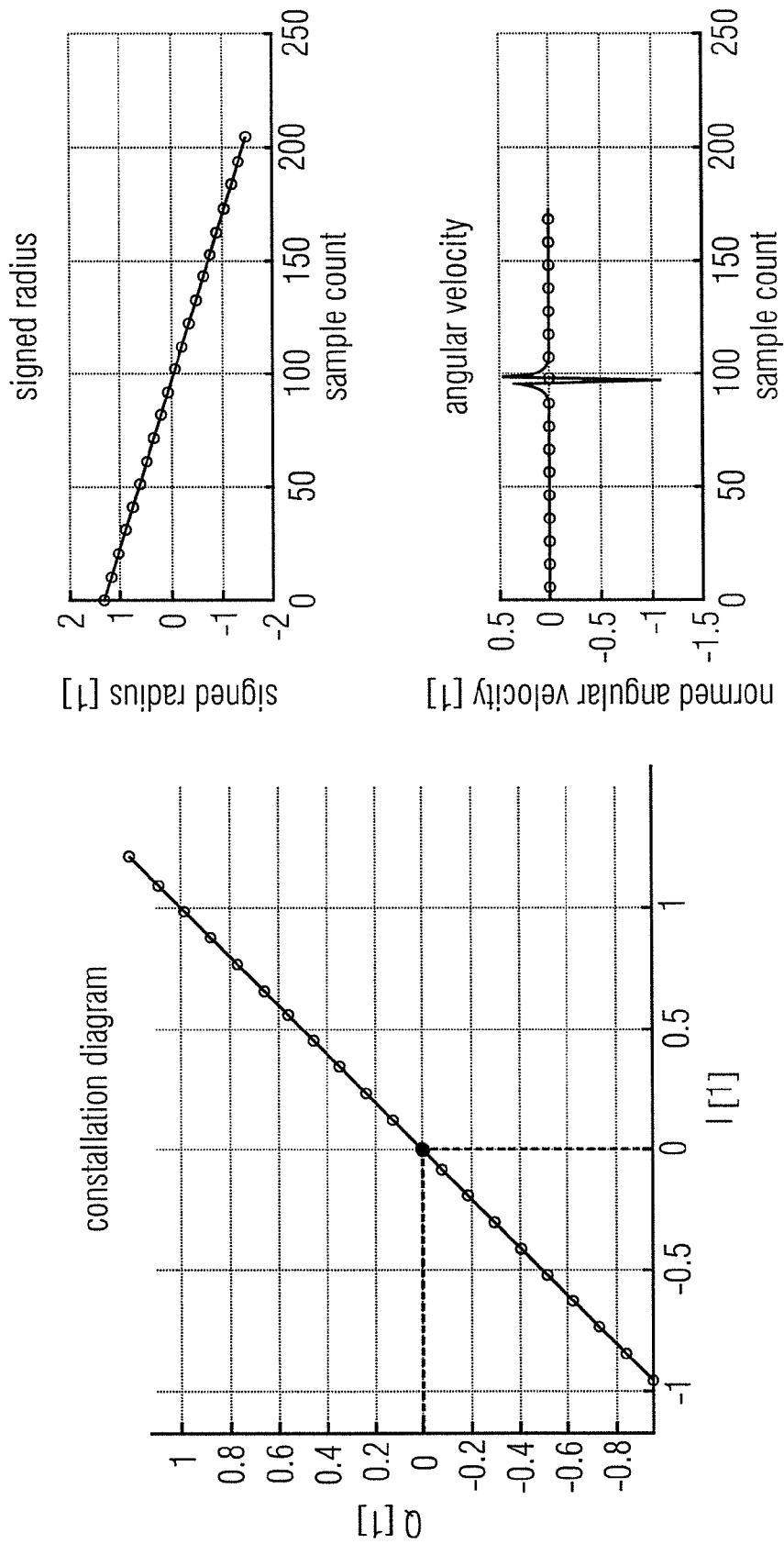
Figure 16:
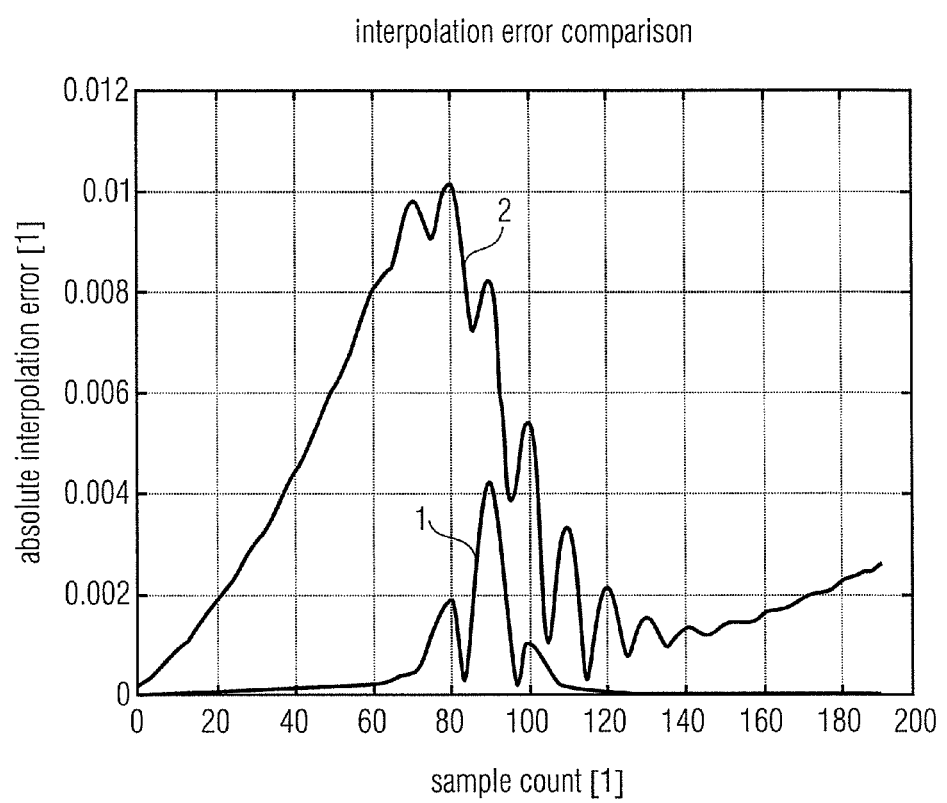
FIG. 16 represents the interpolation error for known approaches and approaches forcing the signal through the constellation origin.

Thus, the approach described with respect to FIG. 14 is advantageous in terms of introducing smaller error pulses for modifying the complex-valued signal, and providing phase/frequency—and radius—signals having a lower number of high frequency components being easier to interpolate as shall be explained in the following with regard to FIGS. 15A-15B and 16 in further detail. FIGS. 15A-15B show a comparison of forced zero crossing when compared to known frequency limited signals, wherein FIG. 15A represents known frequency limited signals, and FIG. 15B shows signals forced through the constellation origin. FIG. 16 represents the interpolation error for known approaches and approaches forcing the signal through the constellation origin, wherein FIG. 16 shows the curve 1 for the results when forcing the signal through the constellation origin and curve 2 shows the interpolation error for conventional approaches. As can be seen from FIGS. 15A-15B, two linear trajectories are shown, one passing by the constellation origin and one going through the constellation origin. These examples represent the signal behavior close to the constellation origin when using a non-frequency limiter, and the behavior of the signal when using a frequency limiter as described above forcing the signal through the constellation origin. In the R/frequency diagrams it can be seen that the signal passing through the constellation origin is easier to interpolate in radius and frequency coordinates than the trajectory passing through the constellation origin at some distance. In FIG. 16, the interpolation error for the two cases is plotted together, and the signal passing through the constellation origin shows a much smaller error. A very simple linear interpolation may be used, however, more advanced interpolation methods may also be used, but the principle is the same, that is the pulse passing through the constellation origin will show a smaller interpolation error.

Figure 17A:
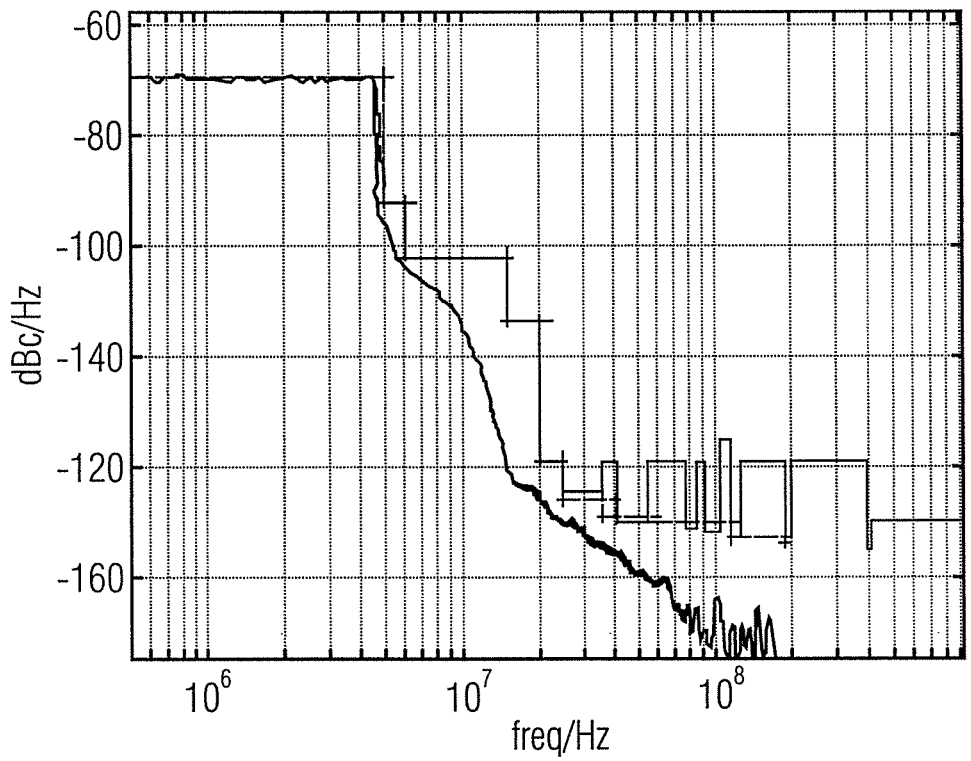
FIGS. 17A-17B show an LTE simulation (digital chain including interpolation) using a known signal limiting approach (see FIG. 17A) and the above described forcing zero crossings (see FIG. 17B)
Figure 17B:
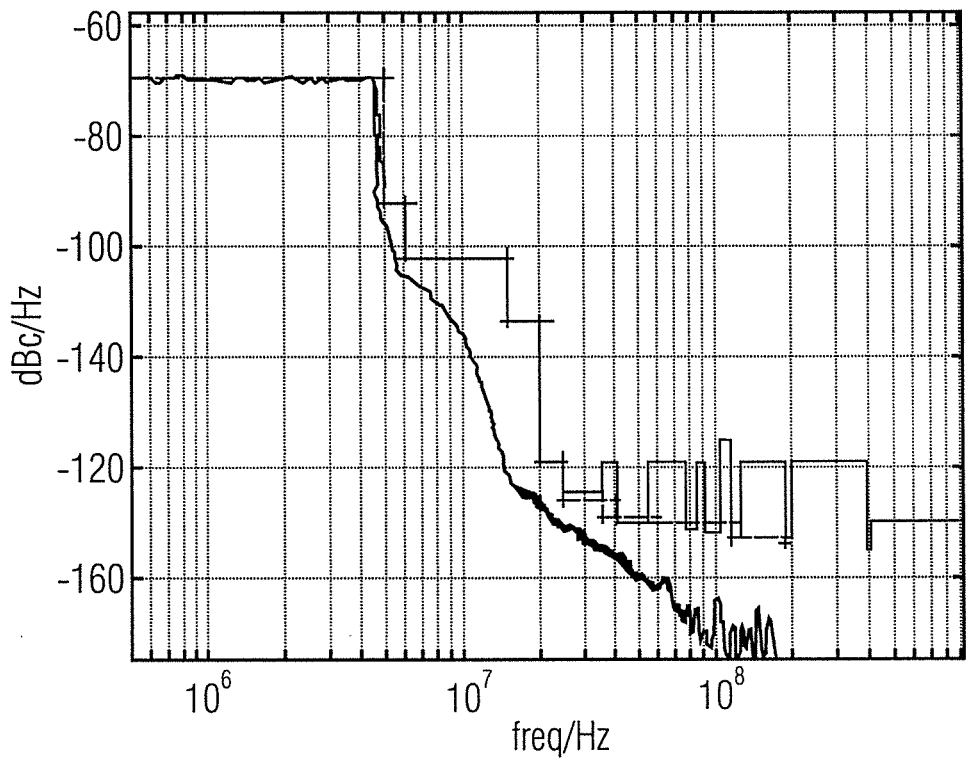

Given the advantages discussed above of forcing a signal through the constellation origin, when compared to known approaches, an improved noise performance and EVM/ACLR performance can be achieved, as can be derived from FIGS. 17A-17B showing an LTE simulation (digital chain including interpolation) using a known signal limiting approach (see FIG. 17A) and the above described forcing zero crossings (see FIG. 17B). The LTE simulation uses a fixed frequency limit, and it can be seen from a comparison of FIGS. 17A and 17B that all displayed transmission metrics are better in FIG. 17B, for example EVM is about 0.7%, ACLR is about 2 dB and the noise spec distance is about 0.5 dB.

Figure 18:
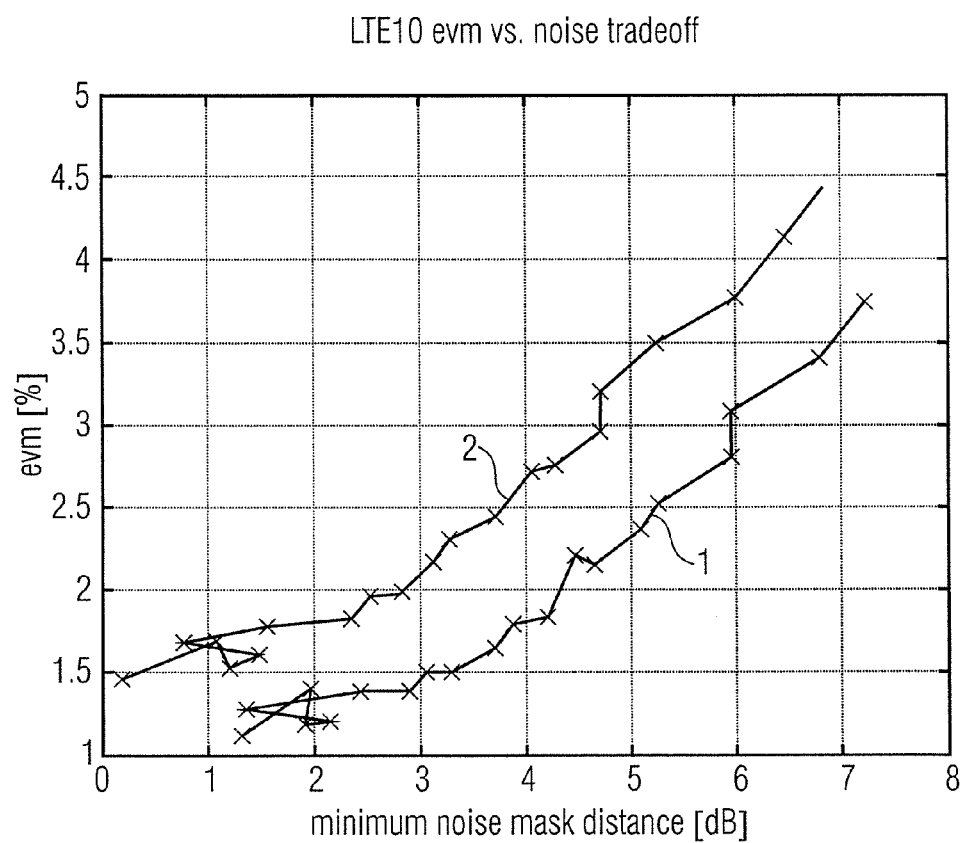
FIG. 18 shows the EVM versus noise tradeoff for the LTE10 simulations of FIGS. 17A-17B.

FIG. 18 shows the EVM versus noise tradeoff for the above mentioned LTE10 simulation, where it can be seen that the tradeoff when using active zero crossing (see curve 1) significantly dominates known approaches (see curve 2). Thus, the above described approach extends frequency limit strategies known so far. In accordance with an example, under specific conditions it is desired to alter the signal trajectory such that it goes preferably through the constellation origin instead of only close by the constellation origin. While known frequency limit strategies shift the trajectory only away from the constellation origin, in specific situations the opposite is done, namely not altering the trajectory to run farther from the constellation origin, but altering the trajectory to run closer to the constellation origin. While altering the trajectory to run farther from the constellation origin results in broader frequency peaks in the polar domain, altering the trajectory to run closer to the constellation origin produces in the polar domain a high and narrow peak which can be eliminated in the radius signal by changing the sign of the radius, as described above. The active zero crossing algorithm may be provided in the above described polar transmitter architecture for any communication system, for example in a communication system implementing dual cell HSUPA or LTE, especially for bandwidths of 10 MHz and above.

There are different criteria when to alter a signal to run closer or through the constellation origin and when not to, and when combining a frequency limiter and an active zero crossing algorithm one possibility is to use a (programmable) angular velocity threshold as a decision criteria. Other decision strategies may include the distance of the trajectory from the constellation origin, a signal curvature, a mode of operation, TX output power and so on. To force the signal through the constellation origin, one possibility is to add a pulse of finite length to the original signal, and the amplitude of the pulse may be chosen such that the sum of the pulse and the original signal passes through or very close by the constellation origin. The pulse shape may be selected to minimize the signal degradation in terms of EVM, ACLR, noise emission and the like. This may provide for a fairly easy method of controlling the signal degradation due to the active zero crossing, and the pulses may be defined to get a frequency response curve which follows the spectrum emission mask of a given communication system.

Figure 19:
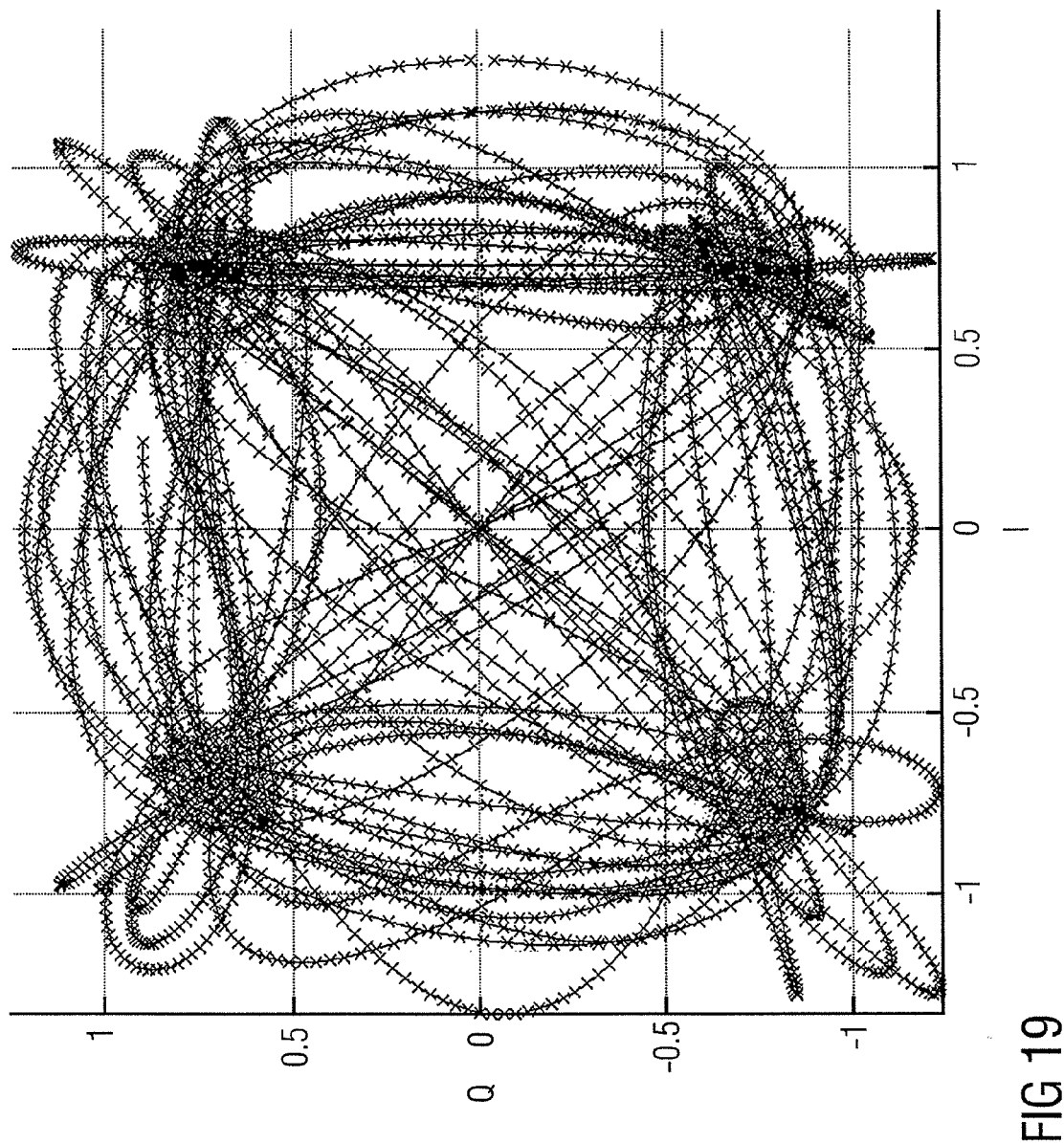
FIG. 19 shows a constellation diagram obtained when applying the active zero crossing approach.

FIG. 19 shows a constellation diagram that is obtained when applying the active zero crossing approach as described above. As can be seen from a comparison of FIG. 19 and FIG. 3, the constellation diagram of FIG. 19 shows that the trajectories which, in FIG. 3, were close to the constellation origin, have been forced to pass through the constellation origin, thereby achieving for these trajectories the above mentioned advantages.

One possible implementation of the half circle shift is shown in FIG. 14 above, and when placing the half circle shift in the phase rather than in the frequency domain, the algorithm needs to be adapted to operate on the phase rather than on the frequency. With regard to FIG. 14, one possibility for placing the frequency limiter block has been described. However, it may be placed at other positions within a polar transmitter chain, as shall be described in further detail with regard to FIGS. 20A-20F showing different placements of the zero forcing algorithm within a polar transmitter chain. In FIGS. 20A-20F, the pulse shape blocks 110a to and 110b are formed by respective transmission filters and the blocks indicated in FIGS. 20A-20F corresponding to the blocks indicated in FIG. 14 have associated therewith the same reference signs and are not described again.

FIG. 20A shows a first possible configuration of a polar transmitter chain in which the frequency limiter block 120 combines a frequency limiter and active zero crossing, thereby allowing for a functionality of altering a signal trajectory to run closer to or to run farther from the constellation origin, as described above for example with regard to FIG. 11. In FIG. 20A the half circle shift block 150 operates in the polar domain, i.e. the zero crossing is determined based on the phase signal obtained from the cordic block 130 and only once the zero crossing has been detected is the phase signal transformed into the frequency domain by block 140.

Figure 20C:
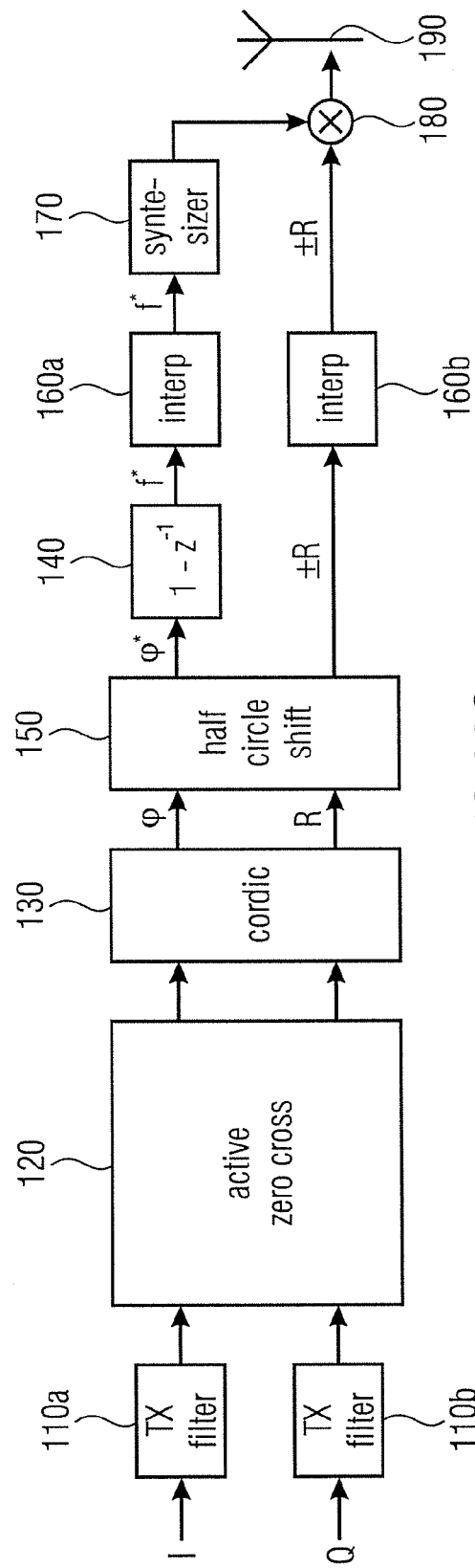

FIG. 20B shows a structure corresponding to the one of FIG. 14. FIG. 20C shows a polar transmitter chain similar to FIG. 20A, except that only active zero crossing is implemented in the frequency limiter block 120, i.e. only altering the signal trajectory to run closer to the constellation origin as described above with regard to FIGS. 9 and 10 is implemented.

Figure 20D:
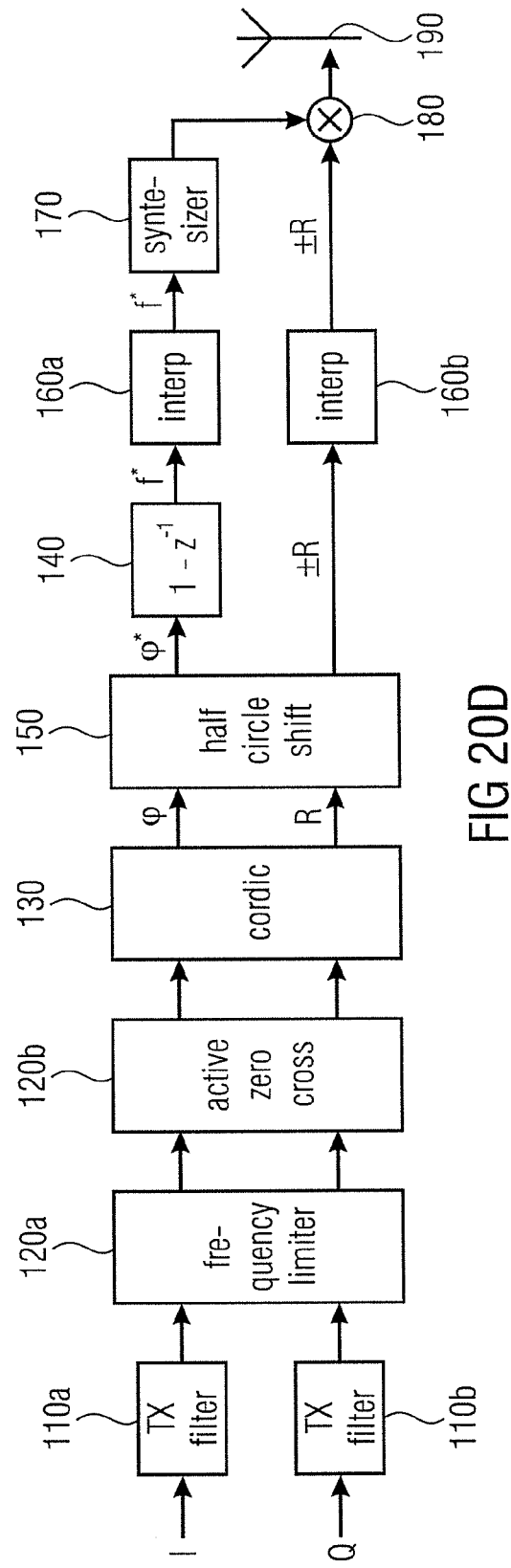

FIG. 20D shows a polar transmitter chain implementation similar to the one of FIG. 20A, except that the frequency limiter and the circuitry for active zero crossing do not share the same hardware but are provided by separate hardware circuits as is depicted by block 120a and 120b.

Figure 20E:
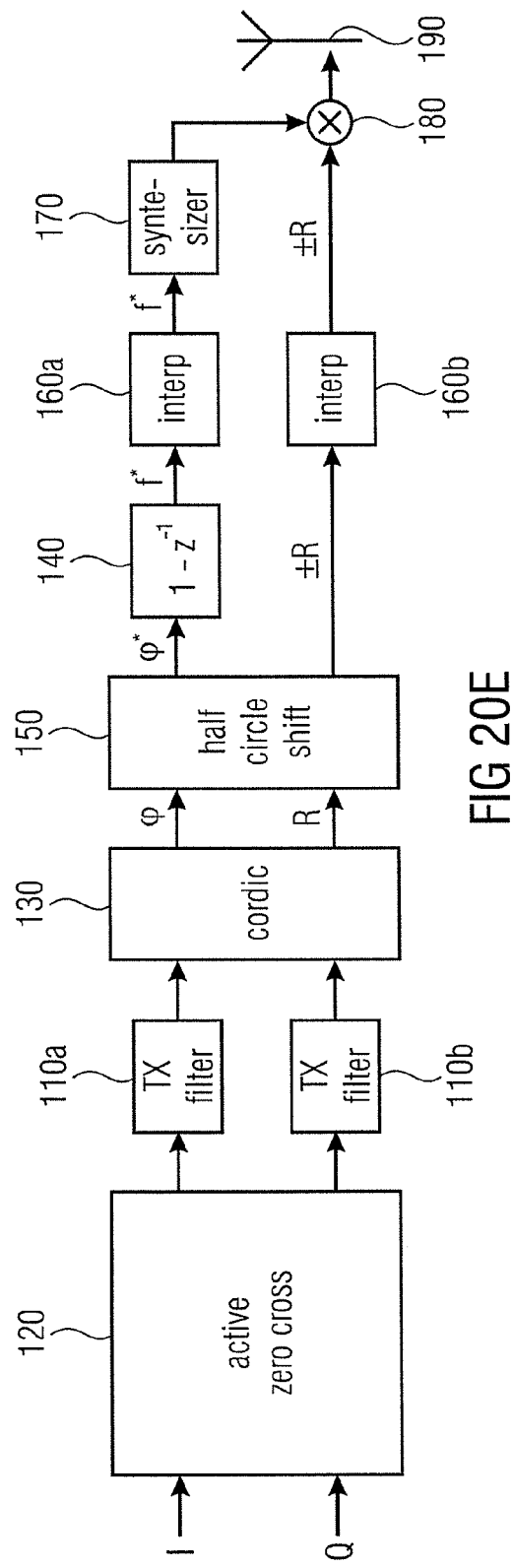

FIG. 20E shows a power transmitter chain implementation similar to FIG. 20B except that the active zero crossing algorithm is directly applied to the unfiltered I-signal and Q-signal.

Figure 20F:
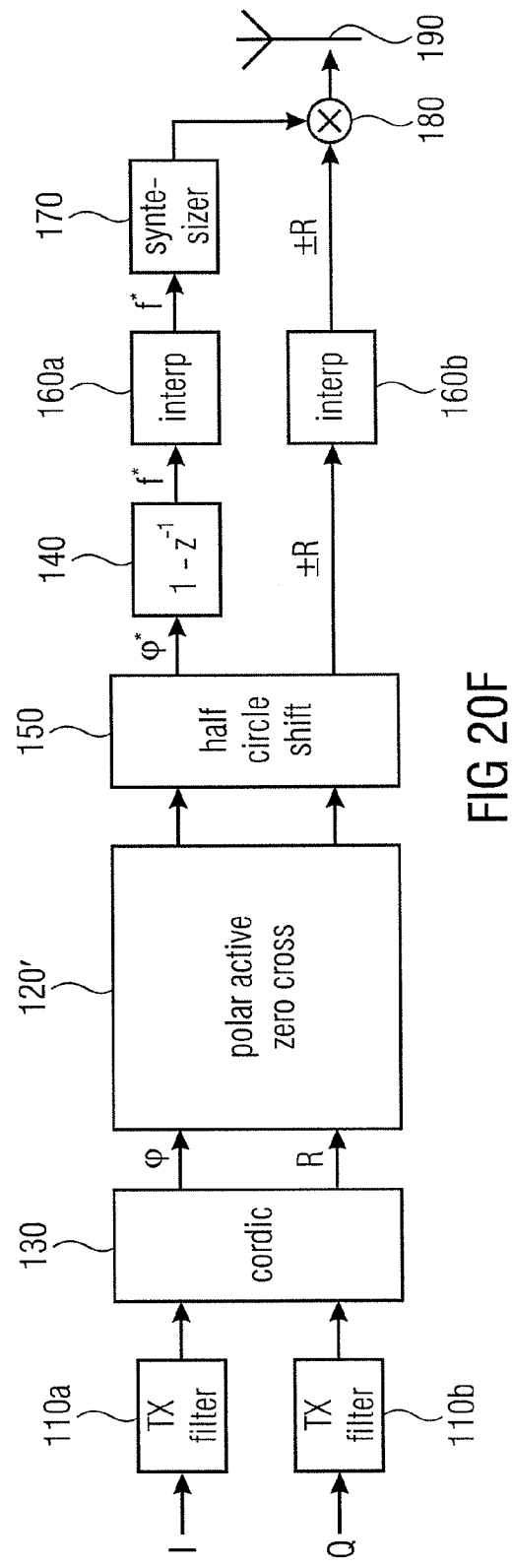

FIG. 20F shows a further power chain implementation, where the active zero crossing is not done in the I/Q domain, but is done in the polar domain so that, for example when compared to FIG. 20E, the active zero crossing block is now arranged between the output of the cordic block and the input of the peak detector.

Polar active zero crossing may include identifying a frequency maximum and magnifying this to correspond to a 180° phase difference of two consecutive samples. The phase change added to the peak would be subtracted from the frequency of phase signal and the proximity of the frequency peak. It will be integrated with a radius sign toggle mechanism as described above.

Although some aspects have been described in the context of an apparatus, it is clear that these aspects also represent a description of the corresponding method, where a block or device corresponds to a method act or a feature of a method act. Analogously, aspects described in the context of a method act also represent a description of a corresponding block or item or feature of a corresponding apparatus. Some or all of the method acts may be executed by (or using) a hardware apparatus, like a microprocessor, a programmable computer or an electronic circuit. Some one or more of the most important method acts may be executed by such an apparatus.

The implementation may be in hardware or in software or may be performed using a digital storage medium, for example a floppy disk, a punch card, a tape, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. A data carrier may be provided which has electronically readable control signals, which are capable of cooperating with a programmable computer system, such that the method described herein is performed.

The implementation may also be in the form of a computer program product with a program code, the program code being operative for performing the method when the computer program product runs on a computer. The program code may be stored on a machine readable carrier that is a non-transitory medium.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

What is claimed is:

1. A method for modifying a complex-valued signal represented by a first symbol and a second symbol, comprising:
   determining a signal trajectory of the complex-valued signal between the first symbol and the second symbol using an analyzer; and
   if the signal trajectory passes nearby the constellation origin, altering the signal trajectory to run closer to the constellation origin using a signal enhancer;
   wherein passing of the signal trajectory nearby the constellation origin is determined when a predefined characteristic of the signal trajectory fulfills a predefined first criterion;
   wherein the predefined characteristic of the signal trajectory comprises a relative phase angle between the first symbol and the second symbol; and
   wherein the method comprises altering the signal trajectory to run closer to the constellation origin, if the relative phase angle of the signal trajectory exceeds a phase angle threshold.

2. The method of claim 1, further comprising:
   determining whether the predefined characteristic of the signal trajectory fulfills a second criterion, and
   if the predefined characteristic of the signal trajectory fulfills the second criterion but not the first criterion, altering the signal trajectory to run farther from the constellation origin.

3. The method of claim 1, wherein, for the predefined characteristic of the signal trajectory comprising the relative phase angle, the criterion comprises a phase angle threshold, and the method comprises altering the signal trajectory to run closer to the constellation origin, if the relative phase angle is between a first phase angle threshold and a second phase angle threshold.

4. The method of claim 1, wherein altering the signal trajectory to run closer to the constellation origin comprises combining an enhancement pulse with at least one of the first symbol and the second symbol.

5. The method of claim 1, wherein the complex-valued signal comprises an I/Q-signal or a polar signal.

6. The method of claim 1, wherein altering the signal trajectory to run closer to the constellation origin comprises altering the signal trajectory to run through the constellation origin.

7. The method of claim 1, wherein altering the signal trajectory to run closer to the constellation origin comprises altering the signal trajectory to run closer to the constellation origin by a predetermined amount.

8. The method of claim 7, wherein the predetermined amount is set to process the modified complex-valued signal in accordance with the processing capabilities of a signal processing stage receiving the modified complex-valued signal.

9. The method of claim 2, further comprising altering the signal trajectory to run farther from the constellation origin to process the modified complex-valued signal in accordance with the processing capabilities of a signal processing stage receiving the modified complex-valued signal.

10. The method of claim 9, wherein the first criterion is selected, when altering the signal trajectory to run closer to or farther from the constellation origin, to have substantially the same error being introduced into the complex-valued signal.

11. The method of claim 1, wherein the complex-valued signal is based on an input signal to be transmitted via an antenna coupled to a transmitter, the method comprising:
outputting the modified complex-valued signal to the transmitter for generating a transmission signal.

12. A method for providing a transmit signal to be transmitted via an antenna of a mobile communication device, comprising:
receiving an input signal, the input signal comprising a complex-valued signal representing at least a first symbol and a second symbol;
modifying the complex-valued signal by determining a distance of a signal trajectory of the complex-valued signal from a constellation origin based on a relative phase angle between the first symbol and the second symbol, and combining an enhancement pulse with at least one of the first symbol and the second symbol for altering the signal trajectory to run closer to the constellation origin, if the relative phase angle is between a first threshold angle and a second threshold angle, and
based on the modified complex-valued signal, generating the transmit signal.

13. The method of claim 12, wherein the modified complex-valued signal is provided in polar coordinates, and wherein generating the transmit signal further comprises:
detecting, based on a phase value of the modified complex-valued signal, a frequency peak; and
in response to detecting the frequency peak, changing a sign of a radius value of the modified complex-valued signal.

14. The method of claim 12, wherein the complex-valued signal is provided as an I/Q-signal, and wherein the method further comprises transforming the modified I/Q-signal into polar coordinates and wherein generating the transmit signal further comprises:
detecting, based on a phase value of the modified complex-valued signal, a frequency peak; and
in response to detecting the frequency peak, changing a sign of a radius value of the modified complex-valued signal.

15. The method of claim 12, wherein the complex-valued signal is provided as a polar-coordinate signal.

16. An apparatus for modifying a complex-valued signal represented by a first symbol and a second symbol, the apparatus comprising:
a signal processor, configured to determine a signal trajectory of the complex-valued signal between the first symbol and the second symbol, and, if the signal trajectory passes nearby the constellation origin, to alter the signal trajectory to run closer to the constellation origin;
wherein passing of the signal trajectory nearby the constellation origin is determined when a relative phase angle between the first symbol and the second symbol exceeds a phase angle threshold.

17. An apparatus for providing a transmit signal to be transmitted by an antenna of a mobile communication device, the apparatus comprising:
an input for receiving an input signal, the input signal comprising a complex-valued signal representing at least a first symbol and a second symbol;
a signal processor configured to modify the complex-valued signal by determining a relative phase angle between the first symbol and the second symbol, and combining an enhancement pulse with at least one of the first symbol and the second symbol for altering the signal trajectory to run closer to the constellation origin, if the relative phase angle exceeds a phase angle threshold; and
an output stage configured to generate the transmit signal based on the modified complex-valued signal.

18. The apparatus of claim 17, wherein the complex-valued signal is provided as an I/Q-signal, and wherein the output stage comprises:
a transforming circuit configured to produce the modified complex-valued signal in polar coordinates, and
a peak detector configured to detect, based on a phase value of the modified complex-valued signal, a frequency peak, and to change a sign of a radius value of the modified complex-valued signal in response to detecting the frequency peak.

19. A mobile communication device comprising an apparatus for modifying a complex-valued signal represented by a first symbol and a second symbol, the apparatus comprising:
a signal processor, configured to determine a signal trajectory of the complex-valued signal between the first symbol and the second symbol, and, if the signal trajectory passes nearby the constellation origin, alter the signal trajectory to run closer to the constellation origin;
wherein passing of the signal trajectory nearby the constellation origin is determined when a relative phase angle between the first symbol and the second symbol exceeds a phase angle threshold.

20. A mobile communication device comprising an apparatus for providing a transmit signal to be transmitted by an antenna of a mobile communication device, the apparatus comprising:
an input for receiving an input signal, the input signal comprising a complex-valued signal representing at least a first symbol and a second symbol;
a signal processor configured to modify the complex-valued signal by determining a relative phase angle between the first symbol and the second symbol, and combining an enhancement pulse with at least one of the first symbol and the second symbol to alter the signal trajectory to run closer to the constellation origin, if the relative phase angle exceeds a phase angle threshold; and
an output stage configured to generate the transmit signal based on the modified complex-valued signal.

* * * * *